(12) United States Patent
Gao et al.

(10) Patent No.: US 12,580,711 B2
(45) Date of Patent: Mar. 17, 2026

(54) RELIABLE CSI FEEDBACK TOWARDS MULTIPLE TRPS

(71) Applicant: Telefonaktiebolaget LM Ericsson (publ), Stockholm (SE)

(72) Inventors: Shiwei Gao, Nepean (CA); Siva Muruganathan, Stittsville (CA); Mattias Frenne, Uppsala (SE); Yufei Blankenship, Kildeer, IL (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 480 days.

(21) Appl. No.: 18/039,037

(22) PCT Filed: Nov. 29, 2021

(86) PCT No.: PCT/IB2021/061086
§ 371 (c)(1),
(2) Date: May 26, 2023

(87) PCT Pub. No.: WO2022/113042

PCT Pub. Date: Jun. 2, 2022

(65) Prior Publication Data
US 2024/0106614 A1 Mar. 28, 2024

Related U.S. Application Data

(60) Provisional application No. 63/118,841, filed on Nov. 27, 2020.

(51) Int. Cl.
*H04L 5/00* (2006.01)
(52) U.S. Cl.
CPC .......... *H04L 5/0057* (2013.01); *H04L 5/0007* (2013.01); *H04L 5/0051* (2013.01)

(58) Field of Classification Search
CPC ... H04L 5/0057; H04L 5/0007; H04L 5/0051; H04L 1/0027; H04L 1/1671;
(Continued)

(56) References Cited

U.S. PATENT DOCUMENTS

| | | | |
|---|---|---|---|
| 2019/0149379 A1* | 5/2019 | Xiong | H04L 5/006 |
| | | | 370/329 |
| 2021/0051650 A1* | 2/2021 | Yi | H04W 72/21 |

(Continued)

FOREIGN PATENT DOCUMENTS

| | | |
|---|---|---|
| WO | 2020044409 A1 | 3/2020 |
| WO | 2022084975 A1 | 4/2022 |

OTHER PUBLICATIONS

Ericsson, "R1-2006367: On PDCCH, PUCCH and PUSCH robustness," 3GPP TSG-RAN WG1 Meeting #102, Electronic Meeting, Aug. 17-28, 2020, 12 pages.

(Continued)

*Primary Examiner* — Sharmin Chowdhury
(74) *Attorney, Agent, or Firm* — Withrow & Terranova, PLLC

(57) ABSTRACT

Systems and methods for reliable Channel State Information (CSI) feedback towards multiple Transmission/Reception Points (TRPs) are provided. In some embodiments, a wireless device receives a configuration for one or more of: Semi-Persistent CSI (SP-CSI) reporting on PUCCH comprising a first PUCCH resource; SP-CSI reporting on PUSCH comprising a reporting periodicity and slot offset; and periodic CSI reporting on PUCCH comprising a second PUCCH resource activated with a third and a fourth spatial relations or uplink TCI states, and a reporting periodicity and slot offset. The wireless device also receives an appropriate activation command and transmits SP-CSI in a PUCCH resource; a periodic CSI in a PUCCH resource; and/or a SP-CSI in a PUSCH resource. In this way, reliabil-
(Continued)

ity of SP-CSI on PUSCH, or SP-CSI on PUCCH, or periodic CSI on PUCCH can be improved by repeating the SP-CSI or periodic CSI over multiple TRPs.

23 Claims, 19 Drawing Sheets

(58) Field of Classification Search
CPC ....... H04L 1/0026; H04L 1/0073; H04L 1/08; H04L 5/0092; H04L 5/0094; H04L 5/0096; H04L 5/0023; H04B 7/022; H04B 7/0626; H04B 7/0408
See application file for complete search history.

(56) References Cited

U.S. PATENT DOCUMENTS

| | | | | |
|---|---|---|---|---|
| 2021/0099902 A1* | 4/2021 | Takeda | .................. | H04W 24/10 |
| 2021/0184819 A1 | 6/2021 | Takeda et al. | | |
| 2023/0209567 A1 | 6/2023 | Grossmann et al. | | |
| 2023/0246759 A1* | 8/2023 | Yuan | ................... | H04B 7/0632 |
| | | | | 370/329 |

OTHER PUBLICATIONS

Nokia, et al., "R1-2009480: Summary of Multi-TRP URLLC for PUCCH and PUSCH," 3GPP TSG RAN WG1 #103, Oct. 26-Nov. 13, 2020, Electronic Meeting, 70 pages.
Notice of Reasons for Refusal for Japanese Patent Application No. 2023-532590, mailed Jun. 28, 2024, 8 pages.
Examination Report No. 1 for Australian Patent Application No. 2021388041, mailed Jan. 9, 2024, 2 pages.
Intention to Grant for European Patent Application No. 21819979.2, mailed Jul. 23, 2024, 8 pages.
Author Unknown, "Technical Specification Group Radio Access Network; NR; Multiplexing and channel coding (Release 16)," Technical Specification 38.212, Version 16.3.0, Sep. 2020, 3GPP Organizational Partners, 152 pages.
Author Unknown, "Technical Specification Group Radio Access Network; NR; Physical layer procedures for control (Release 16)," Technical Specification 38.213, Version 16.3.0, Sep. 2020, 3GPP Organizational Partners, 179 pages.
Author Unknown, "Technical Specification Group Radio Access Network; NR; Physical layer procedures for data (Release 16)," Technical Specification 38.214, Version 16.3.0, Sep. 2020, 3GPP Organizational Partners, 166 pages.
Author Unknown, "Technical Specification Group Radio Access Network; NR; Radio Resource Control (RRC) protocol specification (Release 16)," Technical Specification 38.331, Version 16.2.0, Sep. 2020, 3GPP Organizational Partners, 921 pages.
Apple Inc., "R1-2003006: Summary of Email discussion (100b-e-NR-L1enh-URLLC-PUSCH-04] on PUSCH enhancements for NR eURLLC (AI 7.2.5.3)," 3GPP TSG-RAN WG1 Meeting #100bis-e, Apr. 20-30, 2020, Electronic Meeting, 39 pages.
Ericsson, "R1-1909225: Enhancements to multibeam operation," 3GPP TSG-RAN WG1 Meeting #98, Aug. 26-30, 2019, Prague, Czech Republic, 24 pages.
Ericsson, "R1-2009223: On PDCCH, PUCCH and PUSCH enhancements with multiple TRPs," 3GPP TSG-RAN WG1 Meeting #103, Oct. 26-Nov. 13, 2020, Electronic Meeting, 25 pages.
Spreadtrum Communications, "R1-2006258: Discussion on enhancements on Muti-TRP for PDCCH, PUCCH and PUSCH," 3GPP TSG RAN WG1 #102-e, Aug. 17-28, 2020, Electronic Meeting, 5 pages.
VIVO, "R1-2005364: Discussion on enhancement on PDCCH, PUCCH, PUSCH in MTRP scenario," 3GPP TSG RAN WG1 #102-e, Aug. 17-28, 2020, Electronic Meeting, 12 pages.
International Search Report and Written Opinion for International Patent Application No. PCT/IB2021/059846, mailed Jan. 31, 2022, 19 pages.
International Search Report and Written Opinion for International Patent Application No. PCT/IB2021/061086, mailed Feb. 18, 2022, 19 pages.
International Preliminary Report on Patentability for International Patent Application No. PCT/IB2021/061086, mailed Nov. 25, 2022, 20 pages.

* cited by examiner

| Serving Cell ID | | | | BWP ID | | R |
|---|---|---|---|---|---|---|
| R | R | R | $S_3$ | $S_2$ | $S_1$ | $S_0$ |

Oct 1

Oct 2

*FIG. 4*

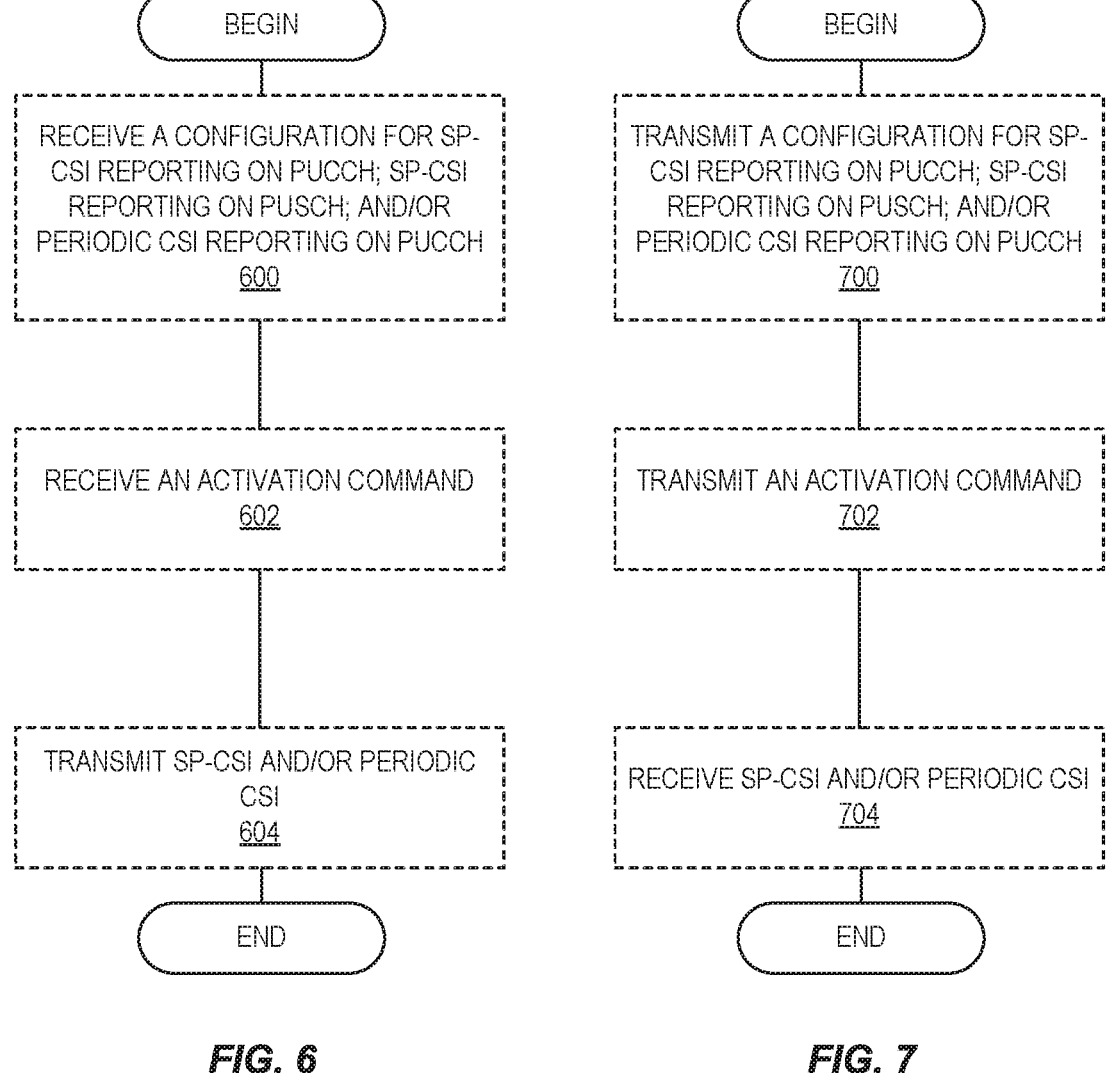
FIG. 6                 FIG. 7

RELIABLE CSI FEEDBACK TOWARDS MULTIPLE TRPS

RELATED APPLICATIONS

This application is a 35 U.S.C. § 371 national phase filing of International Application No. PCT/IB2021/061086, filed Nov. 29, 2021, which claims the benefit of provisional patent application Ser. No. 63/118,841, filed Nov. 27, 2020, the disclosures of which are hereby incorporated herein by reference in their entireties.

TECHNICAL FIELD

The present disclosure relates to reliable Channel State Information (CSI) feedback.

BACKGROUND

New Radio (NR) uses CP-OFDM (Cyclic Prefix Orthogonal Frequency Division Multiplexing) in both downlink (DL) (i.e., from a network node, gNB, or base station, to a user equipment or UE) and uplink (UL) (i.e., from UE to gNB). Discrete Fourier Transform (DFT) spread OFDM is also supported in the uplink. In the time domain, NR downlink and uplink are organized into equally sized subframes of 1 ms each. A subframe is further divided into multiple slots of equal duration. The slot length depends on subcarrier spacing. For subcarrier spacing of $\Delta f=15$ kHz, there is only one slot per subframe, and each slot consists of 14 OFDM symbols.

Data scheduling in NR is typically in slot basis, an example is shown in FIG. 1 with a 14-symbol slot, where the first two symbols contain physical downlink control channel (PDCCH) and the rest contains physical shared data channel, either physical downlink shared channel (PDSCH) or physical uplink shared channel (PUSCH).

Different subcarrier spacing values are supported in NR. The supported subcarrier spacing values (also referred to as different numerologies) are given by $\Delta f=(15\times2^\mu)$ kHz where $\mu\in\{0,1,2,3,4\}$. $\Delta f=15$ kHz is the basic subcarrier spacing. The slot durations at different subcarrier spacings is given by $\frac{1}{2^\mu}$ ms.

In the frequency domain, a system bandwidth is divided into resource blocks (RBs), each corresponds to 12 contiguous subcarriers. The RBs are numbered starting with 0 from one end of the system bandwidth. The basic NR physical time-frequency resource grid is illustrated in FIG. 2, where only one resource block (RB) within a 14-symbol slot is shown. One OFDM subcarrier during one OFDM symbol interval forms one resource element (RE).

In NR, uplink and downlink data transmissions can be either dynamically scheduled using various Downlink Control Information (DCI) formats or semi-statically configured through Radio Resource Control (RRC) signaling. A DCI is carried on a Physical Downlink Control Channel (PDCCH). A UE first decodes a DCI in a PDCCH and then receives data in the scheduled PDSCH or transmits data over the scheduled PUSCH based the decoded DCI. A DCI contains all the necessary information which contains information such as modulation order, coding rate, resource allocation, etc. for a UE to decode a PDSCH or encode and modulate a PUSCH. For semi-statically configured PUSCH transmission, also referred to as Configured Grant (CG).

In NR, there are two PUSCH mapping types supported, Type A and Type B. Type A is usually referred to as slot-based while Type B may be referred to as non-slotbased or mini-slot-based. A slot based transmission typically start in the first OFDM symbol and use the whole slot, i.e., all 14 OFDM symbols, or part of a slot. Mini-slot based PUSCH transmissions can be of any length (i.e., number of OFDM symbols) and can thus start and end in any symbol within a slot. Note that slot or particularly mini-slot transmissions in NR Rel-15 may not cross the slot-border.

In NR release 15 (Rel-15), it is possible to schedule a PUSCH with repetition over multiple slots. The number of repetitions are configured by a RRC parameter pusch-AggregationFactor, which can have a value of 2, 4, or 8. In this case, a PUSCH is repeated in multiple adjacent slots (if the slot is available for UL) up until the number of repetitions configured. This also referred to as slot based PUSCH repetition or PUSCH repetition Type A.

In NR Rel-16, PUSCH repetition type A was enhanced so that the number of repetitions can instead be dynamically indicated, i.e., change from one PUSCH scheduling occasion to the next. The dynamic number of repetitions is configured as part of the time-domain resource allocation (TDRA) for PUSCH. That is, in addition to the starting symbol, S, and the length, L, of the PUSCH in a slot, a number of nominal repetitions, K, can be added to the TDRA. A list of TDRAs can be configured to a UE, different TDRAs can be configured with different K values. By selecting different TDRAs from the list by using the time-domain resource assignment field in DCI signaled from gNB to UE, different number of repetitions can be used. Note that K is the nominal number of repetitions. Some of these repetitions are not valid, for example if the slot is pre-configured as a DL slot, hence the actual number of repetitions may be smaller than the indicated value K. Furthermore, the maximum number of aggregated slots in Rel.16 has been increased to K=16 to account for DL heavy Time Division Duplexing (TDD) patterns (i.e., where majority of slots are DL slots), otherwise the actual number of repetitions would be too small in these cases.

In addition, PUSCH repetition Type B was introduced in NR Rel-16, in which a PUSCH may be repeated multiple times within a slot or across two adjacent slots. When scheduling a transmission with PUSCH repetition Type B, in addition to the starting symbol, S, and the length, L, of the PUSCH, a number of nominal repetitions K is also signaled as part of the time-domain resource allocation (TDRA) in NR Rel-16. The actual number of transmission can be different from the number of nominal repetitions due to reasons such as collision with DL symbols. To determine the actual time domain allocation of PUSCH repetition Type B, a two-step process is used:

1. Allocate K nominal repetitions, each of length L back-to-back (mini slots are placed adjacent to each other in time), ignoring slot boundaries and TDD pattern (i.e., ignoring whether the slot is e.g., DL or UL).

2. If a nominal repetition crosses a slot boundary or occupies symbols are not usable for UL transmission (e.g., UL/DL switching points due to TDD pattern), the offending nominal repetition may be split into two or more shorter actual repetitions. If the number of potentially valid symbols for PUSCH repetition type B transmission is greater than zero for a nominal repetition, the nominal repetition consists of one or more actual repetitions, where each actual repetition consists of a consecutive number of valid symbols for PUSCH repetition Type B transmission within a slot.

Physical Uplink Control Channel (PUCCH) is used in NR to carry UL control information (UCI) such as Hybrid Automatic Repeat reQuest Acknowledgement (HARQ-ACK), Scheduling Request (SR), or Channel State Information (CSI). There are five PUCCH Formats supported in NR, i.e., PUCCH Formats 0 to 4. PUCCH Formats 0 and 2 can be one or two OFDM symbols within a slot and referred to as short PUCCHs, while PUCCH Formats 1,3 and 4 can be 4 to 14 OFDM symbols long and are referred to as long PUCCHs. PUCCH repetition over adjacent slots is supported in NR for long PUCCHs. The number of PUCCH repetitions can be configured by RRC.

Spatial Relation Definition

Spatial relation is used in NR to refer to a relationship between an UL reference signal (RS) to be transmitted such as PUCCH/PUSCH DMRS (demodulation reference signal) and another previously transmitted or received RS, which can be either a DL RS (e.g., CSI-RS (channel state information RS) or SSB (synchronization signal block)) or an UL RS (i.e., SRS (sounding reference signal)). This is also defined from a UE perspective.

If the UE is configured to transmit an UL RS which is configured or indicated as spatially related to a previously received DL RS, it means that the UE should transmit the UL RS in the opposite (reciprocal) direction from which it received the DL RS previously. More precisely, the UE should apply the "same" Transmit (Tx) spatial filtering configuration for the transmission of the UL RS as the Rx spatial filtering configuration it used to receive the spatially related DL RS previously. Here, the terminology 'spatial filtering configuration' may refer to the antenna weights that are applied at either the transmitter or the receiver for data/control transmission/reception. Another way to describe this is that the same antenna "beam" should be used to transmit the signal from the UE as the beam that was used to receive the previous DL RS signal. The DL RS is also referred as the spatial filter reference signal.

On the other hand, if a first UL RS is spatially related to a second UL RS, then the UE should apply the same Tx spatial filtering configuration for the transmission for the first UL RS as the Tx spatial filtering configuration it used to transmit the second UL RS previously. In other words, same beam is used to transmit the first and second UL RS in two different points in time, respectively.

Since the UL RS is associated with a layer of PUSCH or PUCCH transmission (if the UL RS is the DMRS), it is understood that the PUSCH/PUCCH is also transmitted with the same TX spatial filter as the associated UL RS since the PUSCH/PUCCH shall be transmitted with the same filter as the associated DMRS.

Below is an example of spatial relation configuration for PUCCH. It contains a serving cell ID, a spatial relation ID, a reference signal, a pathloss reference signal, and power control parameters for the PUCCH.

PUCCH-SpatialRelationInfo Information Element

```
-- ASN1START
-- TAG-PUCCH-SPATIALRELATIONINFO-START
PUCCH-SpatialRelationInfo ::=        SEQUENCE {
    pucch-SpatialRelationInfoId       PUCCH-
SpatialRelationInfoId,
    servingCellId                     ServCellIndex
OPTIONAL, -- Need S
    referenceSignal                   CHOICE {
        ssb-Index                     SSB-Index,
        csi-RS-Index                  NZP-CSI-RS-
ResourceId,
        srs                           PUCCH-SRS
    },
```

4

-continued

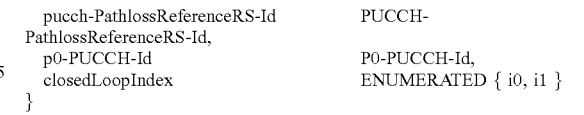

For PUSCH, the spatial relation information is indicated by a Sounding Reference Resource (SRS) Indicator (SRI) which is included in DCI for dynamically scheduled PUSCH and is configured by higher layer signaling for semi-statically configured PUSCH. A SRI indicates an SRS resource associated with a PUSCH transmission.

Channel State Information (CSI) and CSI Feedback

A core component in LTE and NR is the support of MIMO antenna deployments using antenna arrays and Multiple Input Multiple Output (MIMO) related techniques. Spatial multiplexing is one of the MIMO techniques used to achieve high data rates in favorable channel conditions.

For an antenna array with NT antenna ports at the gNB for transmitting r DL symbols $s=[s_1, s_2, \ldots, s_r]^T$, the received signal at a UE with N R receive antennas at a certain RE n can be expressed as:

$$y_n = H_n W_s + e_n$$

where $y_n$ is a $N_R \times 1$ received signal vector; $H_n$ a $N_R \times N_T$ channel matrix at the RE between the gNB and the UE; W is an NT×r precoder matrix; $e_n$ is a $N_R \times 1$ noise plus interference vector received at the RE by the UE. The precoder W can be a wideband precoder, i.e., constant over a whole bandwidth part (BWP), or a subband precoder, i.e., constant over each subband.

The precoder matrix is typically selected from a codebook of possible precoder matrices, and typically indicated by means of a precoder matrix indicator (PMI), which specifies a unique precoder matrix in the codebook for a given number of symbol streams. The r symbols in s each corresponds to a spatial layer and r is referred to as the transmission rank.

For a given block error rate (BLER), the modulation level and coding scheme (MCS) is determined by the Signal to Interference Plus Noise Ratio (SINR), or channel quality. The precoding matrix, the transmission rank, and the channel quality are part of channel state information (CSI), which is typically measured by a UE and fed back to a network node or gNB.

Like in LTE, NR has adopted an implicit CSI mechanism where a UE feeds back the downlink CSI comprising one or more of a transmission rank indicator (RI), a precoder matrix indicator (PMI), and one or two channel quality indicator(s) (CQI). NR supports transmission of either one or two transport blocks (TBs) to a UE in a slot, depending on the rank. One TB is used for ranks 1 to 4, and two TBs are used for ranks 5 to 8. A CQI is associated to each TB. The CQI/RI/PMI report can be either wideband or subband based on configuration.

Channel State Information Reference Signal (CSI-RS)

Similar to LTE, CSI-RS was introduced in NR for channel measurement in the downlink. A CSI-RS is transmitted on each transmit antenna port and is used by a UE to measure downlink channel associated with each of antenna ports. The antenna ports are also referred to as CSI-RS ports. The supported number of antenna ports in NR are {1,2,4,8,12, 16,24,32}. By measuring the received CSI-RS, a UE can estimate the channel the CSI-RS is traversing, including the radio propagation channel and antenna gains. CSI-RS for channel measurement purpose is also referred to as Non-Zero Power (NZP) CSI-RS. NZP CSI-RS can be configured to be transmitted in certain REs in a PRB.

CSI resource for interference measurement, CSI-IM, is used in NR for a UE to measure noise and interference, typically from other cells. Typically, gNB does not transmit any signal in the CSI-IM resource so that what is observed in the resource is noise and interference from other cells.

By measuring the channel based on a NZP CSI-RS resource and interference based on a CSI-IM resource, a UE can estimate the CSI, i.e., RI, PMI, and CQI(s).

CSI reporting in NR

In NR, a UE can be configured with one or multiple CSI Report Settings, each configured by a higher layer parameter CSI-ReportConfig. Each CSI-ReportConfig is associated with a BWP and contains one or more of the followings a CSI resource configuration for channel measurement a CSI-IM resource configuration for interference measurement reporting configuration type, i.e., aperiodic CSI (on PUSCH), periodic CSI (on PUCCH), or semi-persistent CSI on PUCCH or on PUSCH.

report quantity specifying what to be reported, such as RI, PMI, CQI codebook configuration such as type I or type II CSI frequency domain configuration, i.e., subband vs. wideband CQI or PMI, and subband size CQI table to be used A UE can be configured with one or multiple CSI resource configurations for channel measurement and one or more CSI-IM resources for interference measurement. Each CSI resource configuration for channel measurement can contain one or more Non-Zero Power (NZP) CSI-RS resource sets. For each NZP CSI-RS resource set, it can further contain one or more NZP CSI-RS resources. A NZP CSI-RS resource can be periodic, semi-persistent, or aperiodic.

Similarly, each CSI-IM resource configuration for interference measurement can contain one or more CSI-IM resource sets. For each CSI-IM resource set, it can further contain one or more CSI-IM resources. A CSI-IM resource can be periodic, semi-persistent, or aperiodic.

Semi-Persistent (SP) CSI on PUSCH

A UE performs SP CSI reporting on PUSCH upon successful decoding of a DCI format 0_1 or DCI format 0_2 which activates a SP CSI trigger state. DCI format 0_1 and DCI format 0_2 contains a CSI request field which indicates the SP CSI trigger state to activate or deactivate the reporting. For SP CSI reporting on PUSCH, a set of trigger states are higher layer configured by CSI-SerniPersistentOn-PUSCH-TriggerStateList, where the CSI request field in DCI activates one of the trigger states. Each SP CSI trigger state contains a CSI-ReportConfigId which points to a CSI-ReportConfig with reportConfigType set to semPersistentOnPUSCH. An example of semiPersistentOnPUSCH configuration is shown below, where the Semi-Persistent CSI (SP-CSI) period is configured by reportSlotConfig to one of 5, 10, 20, 40, 80, 160, and 320 slots and a list of slot offsets, one of which is indicated in the activating DCI. pOalpha is a power control parameter.

```
    semiPersistentOnPUSCH        SEQUENCE {
       reportSlotConfig             ENUMERATED
{sl5, sl10, sl20, sl40, sl80, sl160, sl320},
       reportSlotOffsetList         SEQUENCE (SIZE
(1.. maxNrofUL-Allocations)) OF INTEGER(0..32),
```

6

-continued

```
    p0alpha                          P0-PUSCH-
    AlphaSetId
    },
```

FIG. 3 is an example of SP CSI reporting on PUSCH, where the first SP CSI report is sent three slots (the slot offset) after receiving the activation DCI (SP-CSI activation trigger). The SP CSI is then in this example reported every five slots (the period) until a deactivation DCI is received (SP-CSI deactivation trigger).

A codepoint of the CSI request field in the DCI is mapped to a SP-CSI triggering state according to the order of the positions of the configured trigger states in CSI-SemiPersistentOnPUSCH-TriggerStateList, with codepoint '0' mapped to the triggering state in the first position.

A UE validates, for SP CSI activation or release, a DL semi-persistent assignment PDCCH on a DCI only if both of the following conditions are met:

the Cyclic Redundancy Check (CRC) parity bits of the DCI format are scrambled with a SP-CSI— Radio Network Temporary Identifier (RNTI) provided by higher layer parameter sp-CSI-RNTI Special fields for the DCI format are set according to Table 5.2.1.5.2-1 or Table 5.2.1.5.2-2 in 3GPP technical Specification TS38.214.

If validation is achieved, the UE considers the information in the DCI format as a valid activation or valid release of SP CSI transmission on PUSCH, and the UE activates or deactivates a CSI Reporting Setting indicated by CSI request field in the DCI.

TABLE 5.2.1.5.2-1

Special fields for semi-persistent CSI activation PDCCH validation (reproduced from 3gpp TS38.214)

| | DCI format 0_1/0_2 |
|---|---|
| HARQ process number | set to all '0's |
| Redundancy version | set to all '0's |

TABLE 5.2.1.5.2-2

Special fields for semi-persistent CSI deactivation PDCCH validation (reproduced from 3gpp TS38.214)

| | DCI format 0_1/0_2 |
|---|---|
| HARQ process number | set to all '0's |
| Modulation and coding scheme | set to all '1's |
| Resource block assignment | If higher layer configures RA type 0 only, set to all '0's; If higher layer configures RA type 1 only, set to all '1's; If higher layer configures dynamic switch between RA type 0 and 1, then if MSB is'0', set to all '0's; else, set to all '1's For DCI 0_1, if higher layer configures RA type 2, set to all '1's if $\mu = 0$; set to all '0's if $\mu = 1$ |
| Redundancy version | set to all '0's |

Note that SP CSI reporting on PUSCH activated by a DCI format is not expected to be multiplexed with uplink data on the PUSCH.

7

Semi-Persistent (SP) CSI on PUCCH

For SP CSI reporting on PUCCH, a UE is configured with CSI report setting(s) where the higher layer parameter reportConfigType is set to 'semiPersistentOnPUCCH' as shown below:

```
    semiPersistentOnPUCCH          SEQUENCE {
        reportSlotConfig           CSI-
    ReportPeriodicityAndOffset,
        pucch-CSI-ResourceList     SEQUENCE
    (SIZE (1..maxNrofBWPs)) OF  PUCCH-CSI-Resource
    },
```

For SP CSI reporting on PUCCH, the PUCCH resource in each BWP used for transmitting the CSI report is configured by PUCCH-CSI-Resource in semiPersistentOnPUCCH. SP CSI reporting on PUCCH is activated (or deactivated) by an activation (or deactivation) command carried on a Medium Access Control (MAC) Control Element (CE), which selects one of the semi-persistent Reporting Settings for use by the UE on the PUCCH.

The MAC CE is shown in FIG. 4. It contains the following fields:

Serving Cell ID: This field indicates the identity of the Serving Cell;

BWP ID: This field indicates a UL BWP;

$S_i$: This field indicates the activation/deactivation status of the Semi-Persistent CSI report configuration within a list of CSI-ReportConfigs. So refers to the report configuration which includes PUCCH resources for SP CSI reporting in the indicated BWP and has the lowest CSI-ReportConfigId within the list with type set to semPersistentOnPUCCH, $S_1$ to the report configuration which includes PUCCH resources for SP CSI reporting in the indicated BWP and has the second lowest CSI-ReportConfigId and so on. The $S_i$ field is set to 1 to indicate that the corresponding Semi-Persistent CSI report configuration shall be activated. The $S_i$ field is set to 0 to indicate that the corresponding Semi-Persistent CSI report configuration i shall be deactivated;

R: Reserved bit, set to 0.

When the UE would transmit a PUCCH with HARQ-ACK information in slot n corresponding to the PDSCH carrying the activation (or deactivated) command, the indicated SP CSI Reporting Setting is activated starting from the first slot that is after slot $n+3N_{slot}^{subframe,\mu}$ where $N_{slot}^{subframe,\mu}$ is the number of slots per subframe and $\mu$ is the Sub-Carrier Spacing (SCS) configuration for the PUCCH.

Periodic CSI on PUCCH

Periodic CSI is always transmitted on PUCCH. Similar to SP-CSI on PUCCH, the PUCCH resource(s) for carrying periodic CSI is configured in the associated CSI-Report-Config as shown below, where a PUCCH resource carrying the periodic CSI is configured for each BWP:

```
    periodic                       SEQUENCE {
        reportSlotConfig           CSI-
    ReportPeriodicityAndOffset,
        pucch-CSI-ResourceList     SEQUENCE
    (SIZE (1..maxNrofBWPs)) OF  PUCCH-CSI-Resource
    },
```

There currently exist certain challenge(s). In NR up to Release 16, for SP-CSI on PUSCH, there is no repetition supported which is a problem. The number of transmissions in each reporting period is always assumed to be one, regardless of the value of the high layer parameter pusch-AggregationFactor or numberOfRepetitions-r16 configured in a TDRA row indicated by the TDRA field of a DCI activating the SP-CSI. The same is true for periodic CSI and SP-CSI on PUCCH, where a single transmission is always assumed regardless whether PUCCH repetition is configured or not.

In addition, in frequency range 2 (FR2), channel blocking is a particular problem that needs to be overcome. If a SP-CSI or periodic CSI is transmitted by the UE in a slot when the channel between the UE and the TRP is blocked, then the SP CSI or periodic CSI may not be decoded correctly at the gNB.

Deploying multiple TRPs is one efficient way to combat channel blocking, particular in FR2. However, with current SP CSI or periodic CSI reporting in NR, CSI is only sent to one TRP by the UE. How to ensure reliability of SP CSI or periodic CSI in FR2 is an open problem that needs to be solved.

SUMMARY

Systems and methods for reliable Channel State Information (CSI) feedback towards multiple Transmission/Reception Points (TRPs) are provided. In some embodiments, a wireless device receives a configuration for one or more of: Semi-Persistent CSI (SP-CSI) reporting on PUCCH comprising a first PUCCH resource; SP-CSI reporting on PUSCH comprising a reporting periodicity and slot offset; and periodic CSI reporting on PUCCH comprising a second PUCCH resource activated with a third and a fourth spatial relations or uplink TCI states, and a reporting periodicity and slot offset. The wireless device also receives an appropriate activation command and transmits SP-CSI in a PUCCH resource; a periodic CSI in a PUCCH resource; and/or a SP-CSI in a PUSCH resource. In this way, reliability of SP-CSI on PUSCH, or SP-CSI on PUCCH, or periodic CSI on PUCCH can be improved by repeating the SP-CSI or periodic CSI over multiple TRPs.

Certain aspects of the present disclosure and their embodiments may provide solutions to the aforementioned or other challenges. A method is proposed to enable repeating a CSI feedback towards multiple TRPs for SP-CSI on PUSCH, SP-CSI on PUCCH, and periodic CSI on PUCCH.

There are, proposed herein, various embodiments which address one or more of the issues disclosed herein. Certain embodiments may provide one or more of the following technical advantage(s). The proposed solution improves reliability of SP-CSI on PUSCH, or SP-CSI or periodic CSI on PUCCH by repeating the SP-CSI or periodic CSI over multiple TRPs. The solution is particularly beneficial in FR2 scenarios as at least one TRP can receive the SP-CSI or periodic CSI when the one of the TRPs is blocked.

BRIEF DESCRIPTION OF THE DRAWINGS

The accompanying drawing figures incorporated in and forming a part of this specification illustrate several aspects of the disclosure, and together with the description serve to explain the principles of the disclosure.

9

Figures 1, 2:
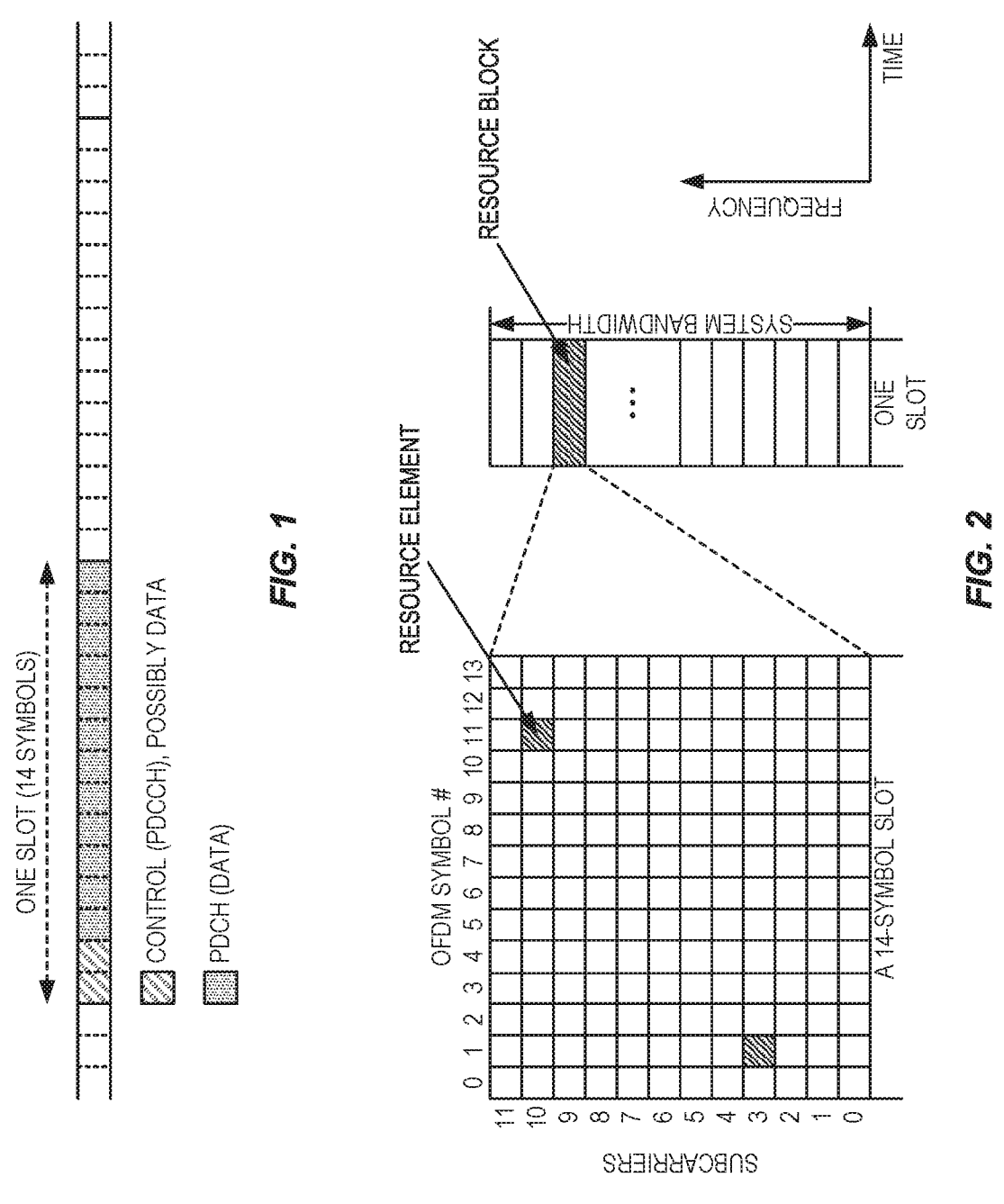
FIG. 1 illustrates that data scheduling in New Radio (NR) is typically in slot basis with a 14-symbol slot, where the first two symbols contain physical downlink control channel (PDCCH) and the rest contains physical shared data channel, either physical downlink shared channel (PDSCH) or physical uplink shared channel (PUSCH)
Figure 3:
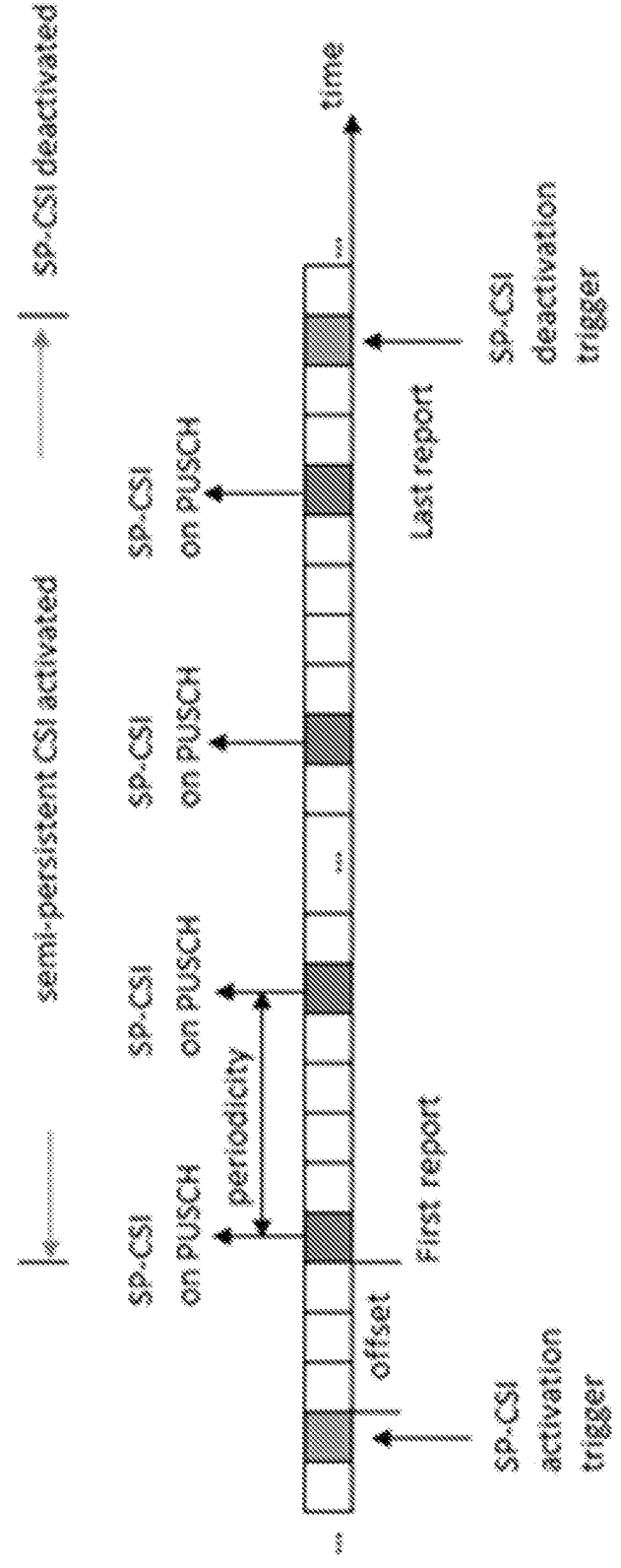
Figure 5:
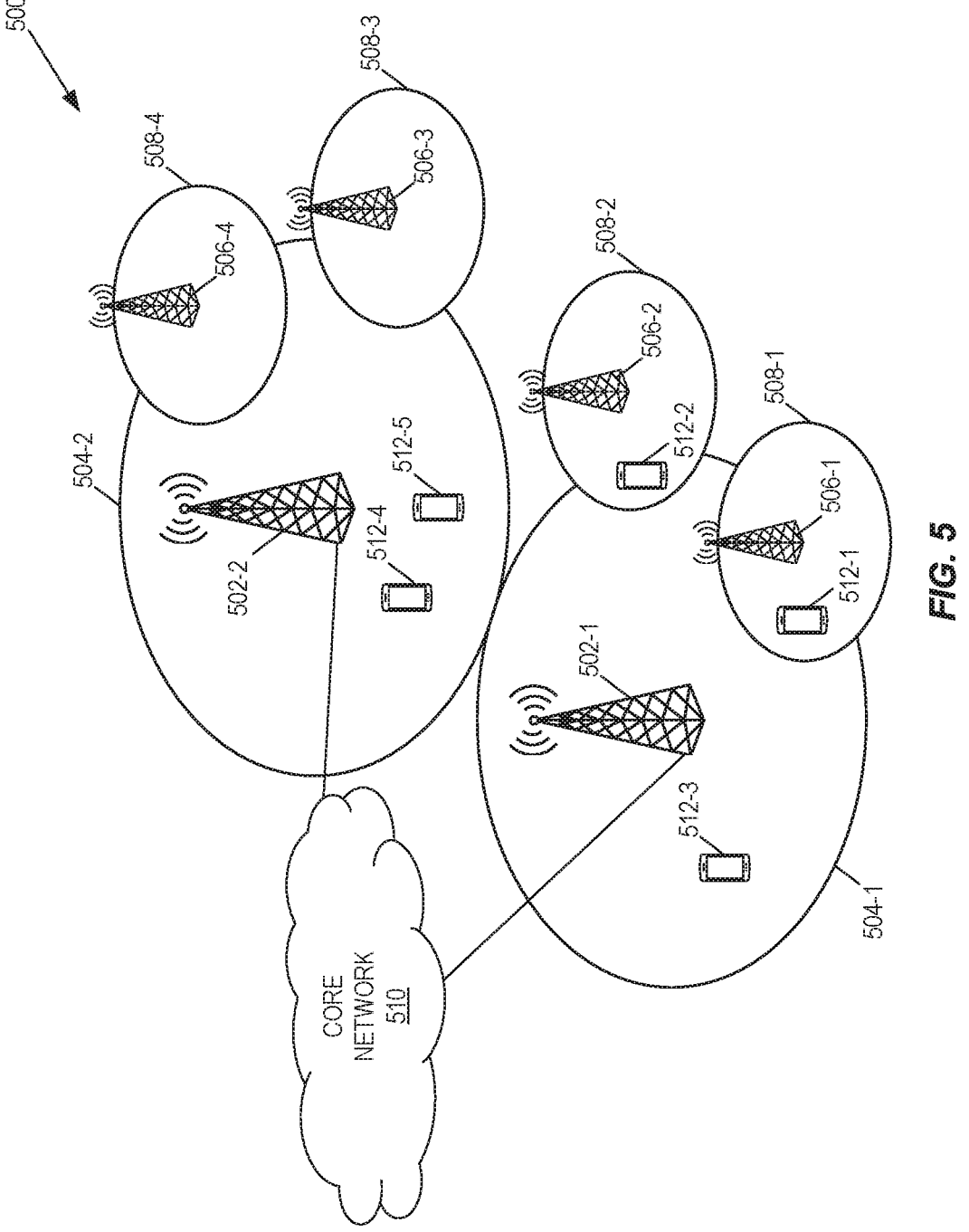
Figure 8:
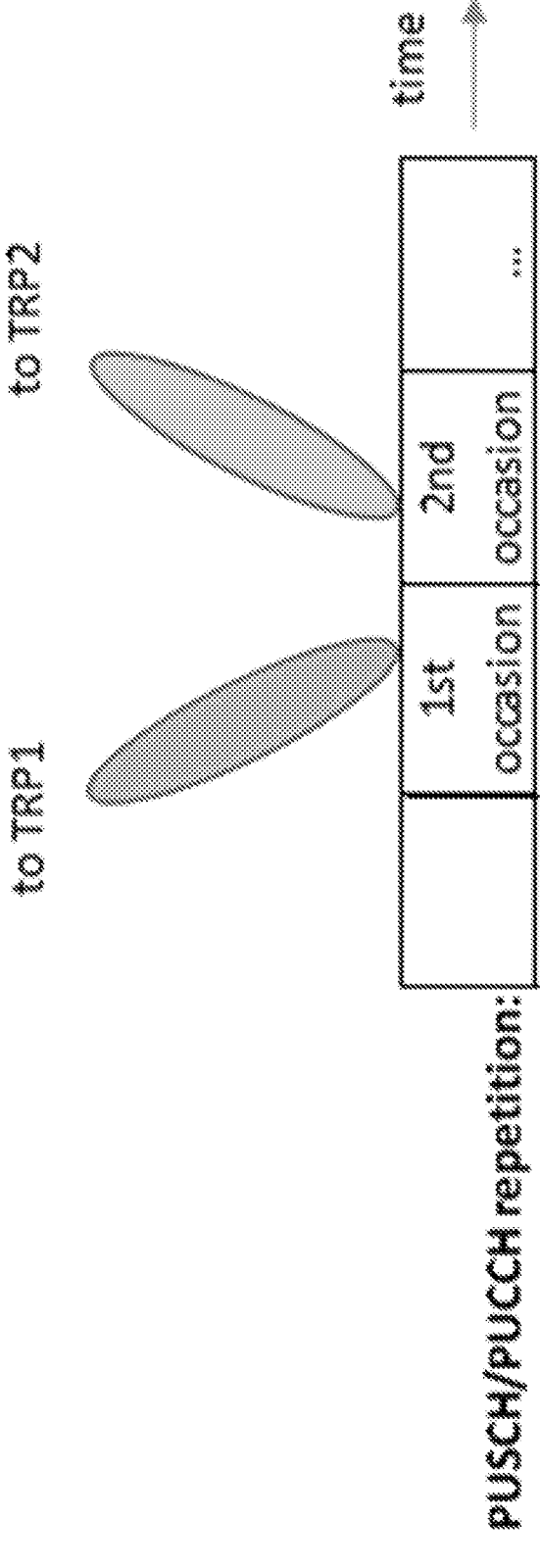
Figure 9:
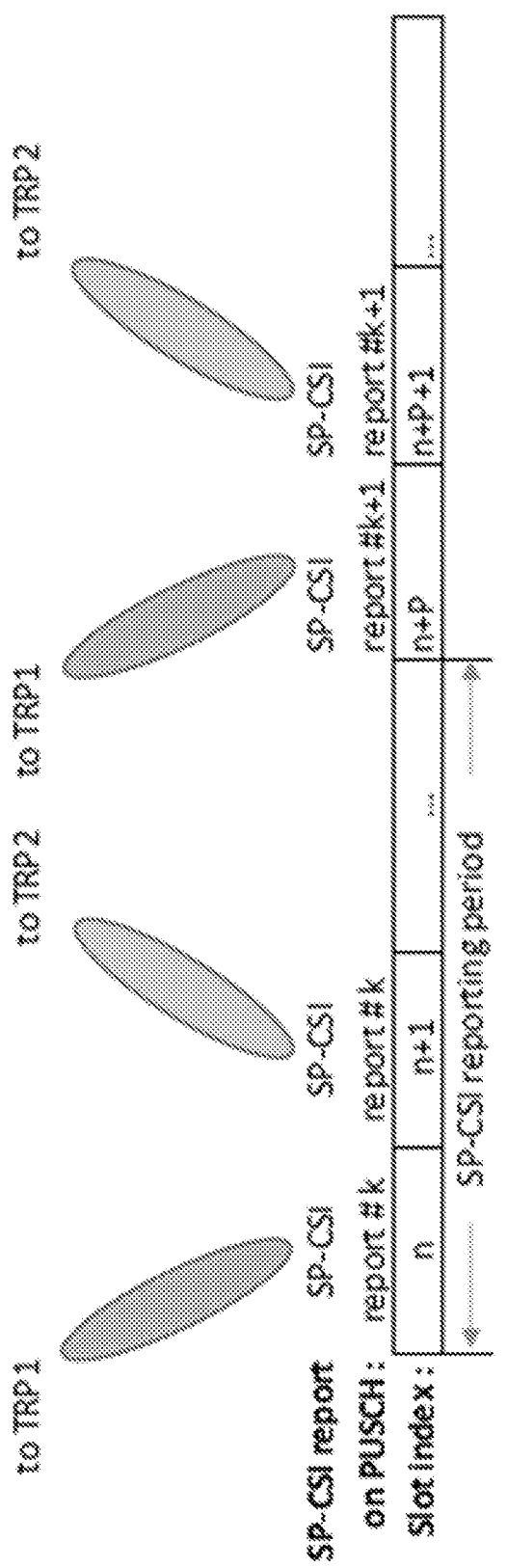
Figure 10:
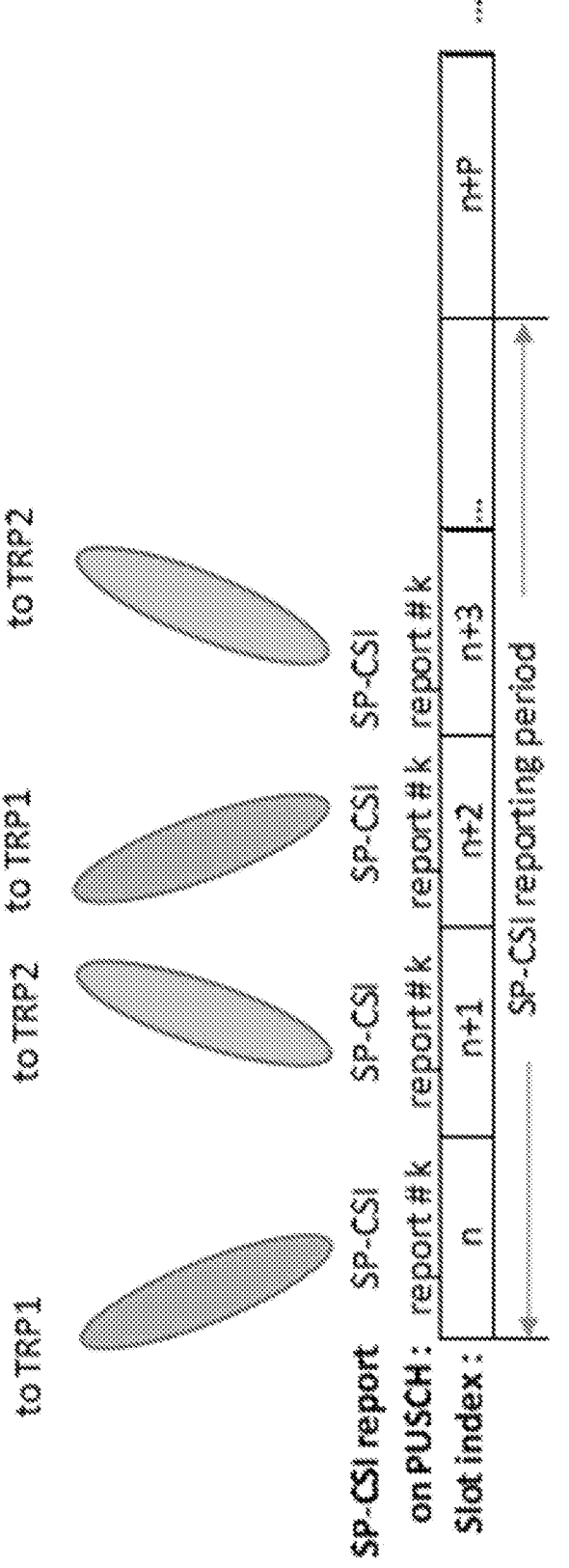
Figure 11:
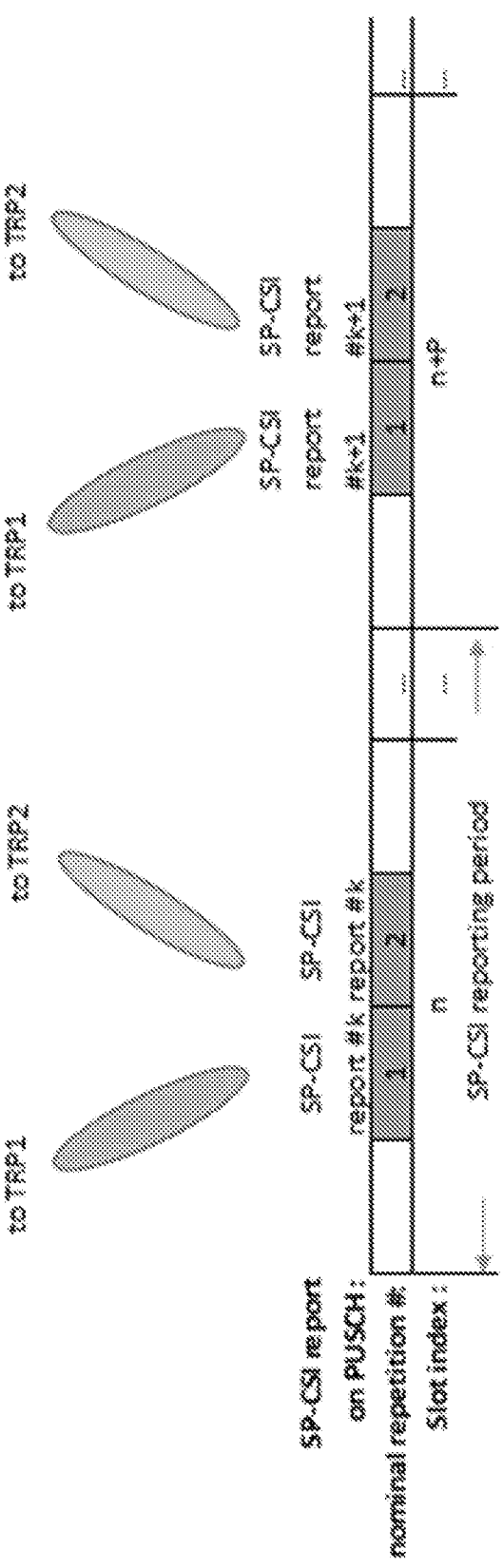
Figure 12:
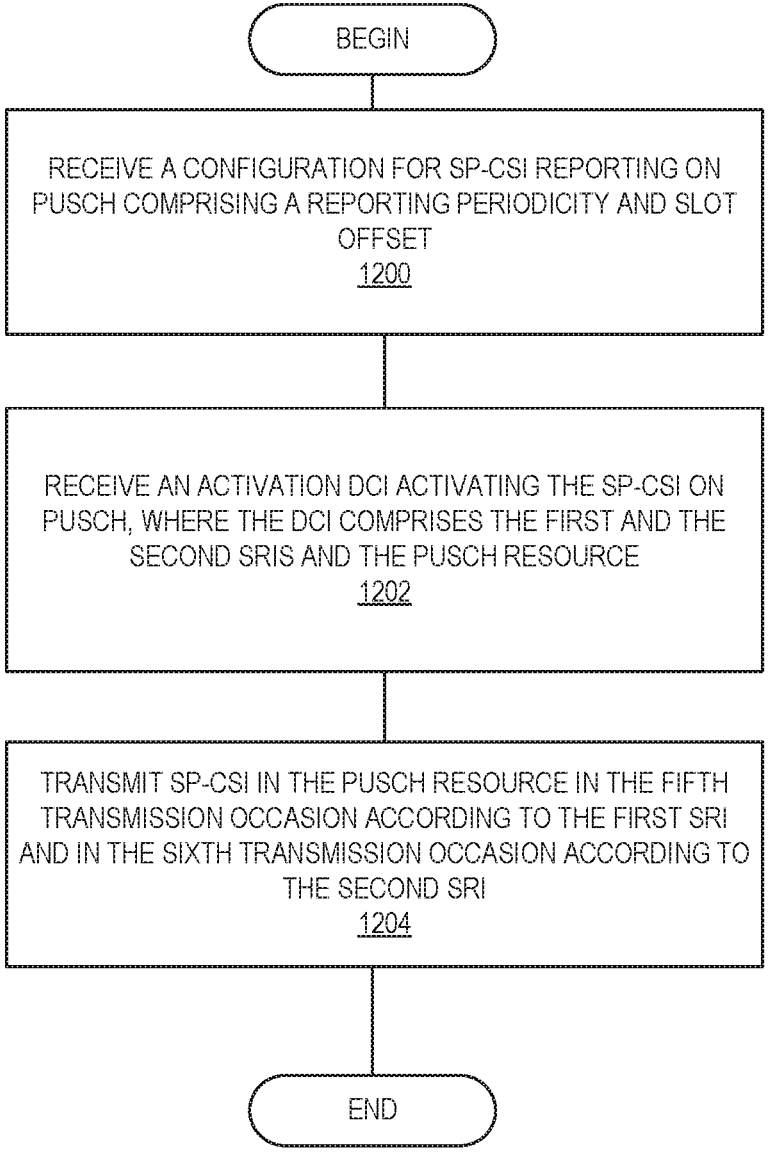
Figure 13:
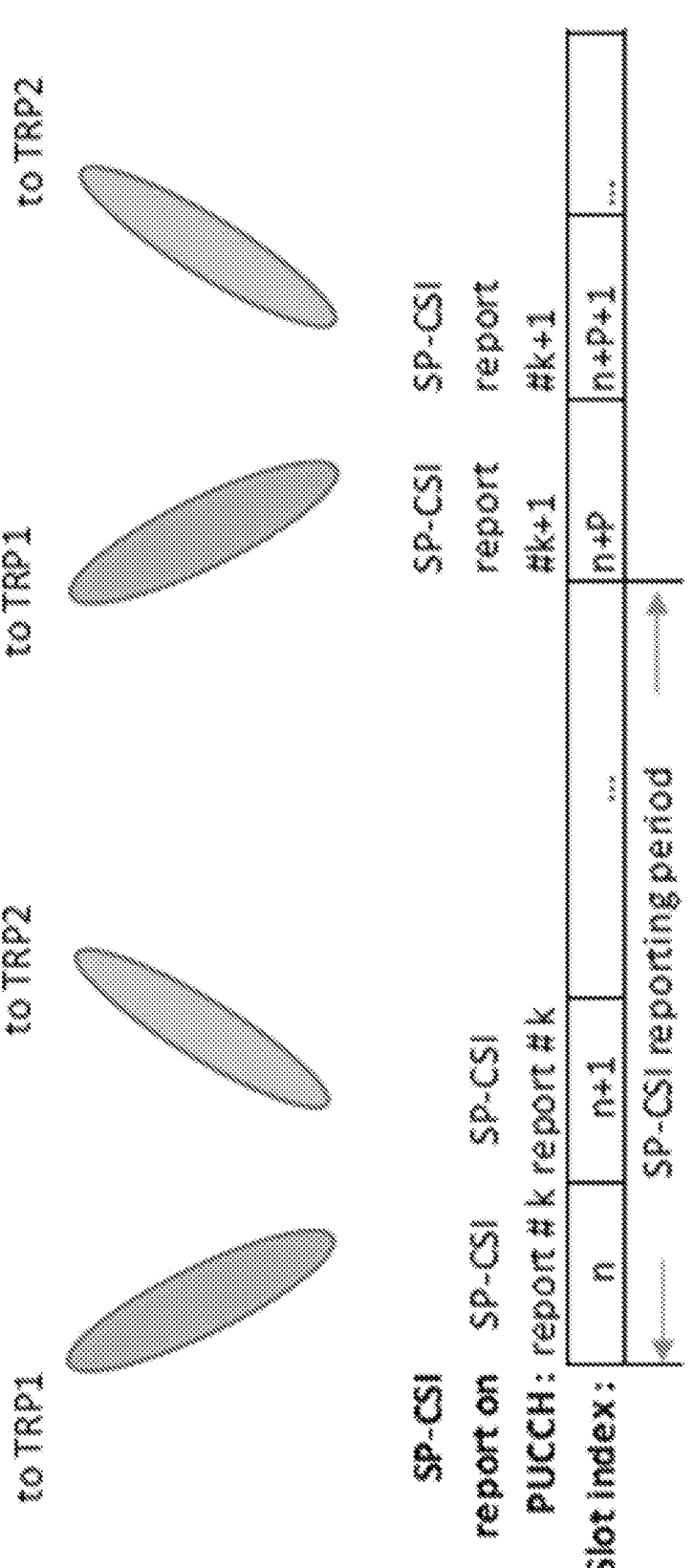
Figure 14:
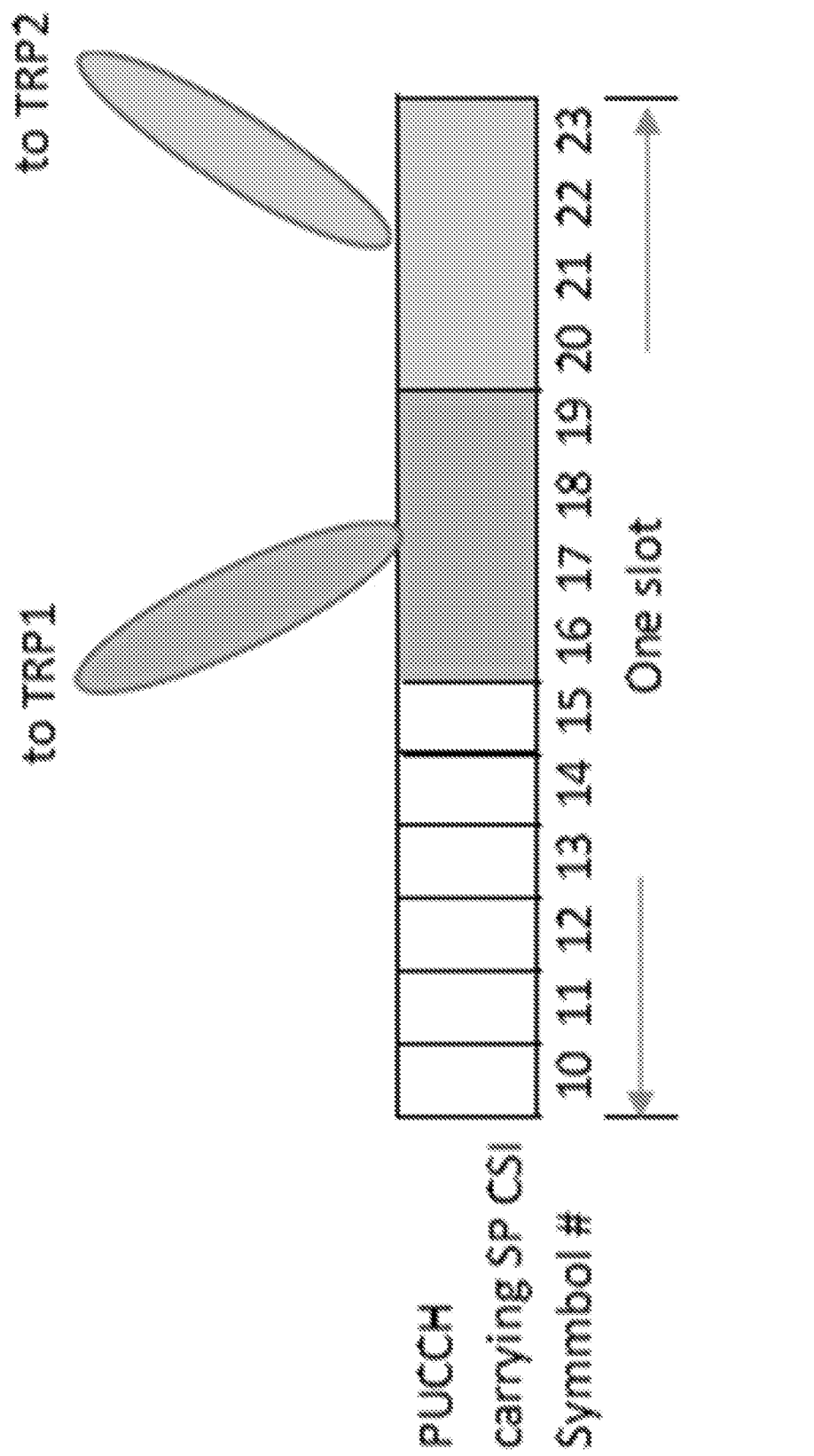

FIG. 2 illustrates the basic NR physical time-frequency resource grid where only one resource block (RB) within a 14-symbol slot is shown;

FIG. 3 illustrates an example of SP CSI reporting on PUSCH, where the first SP CSI report is sent three slots (the slot offset) after receiving the activation DCI (Semi-Persistent CSI (SP-CSI) activation trigger);

Figure 4:
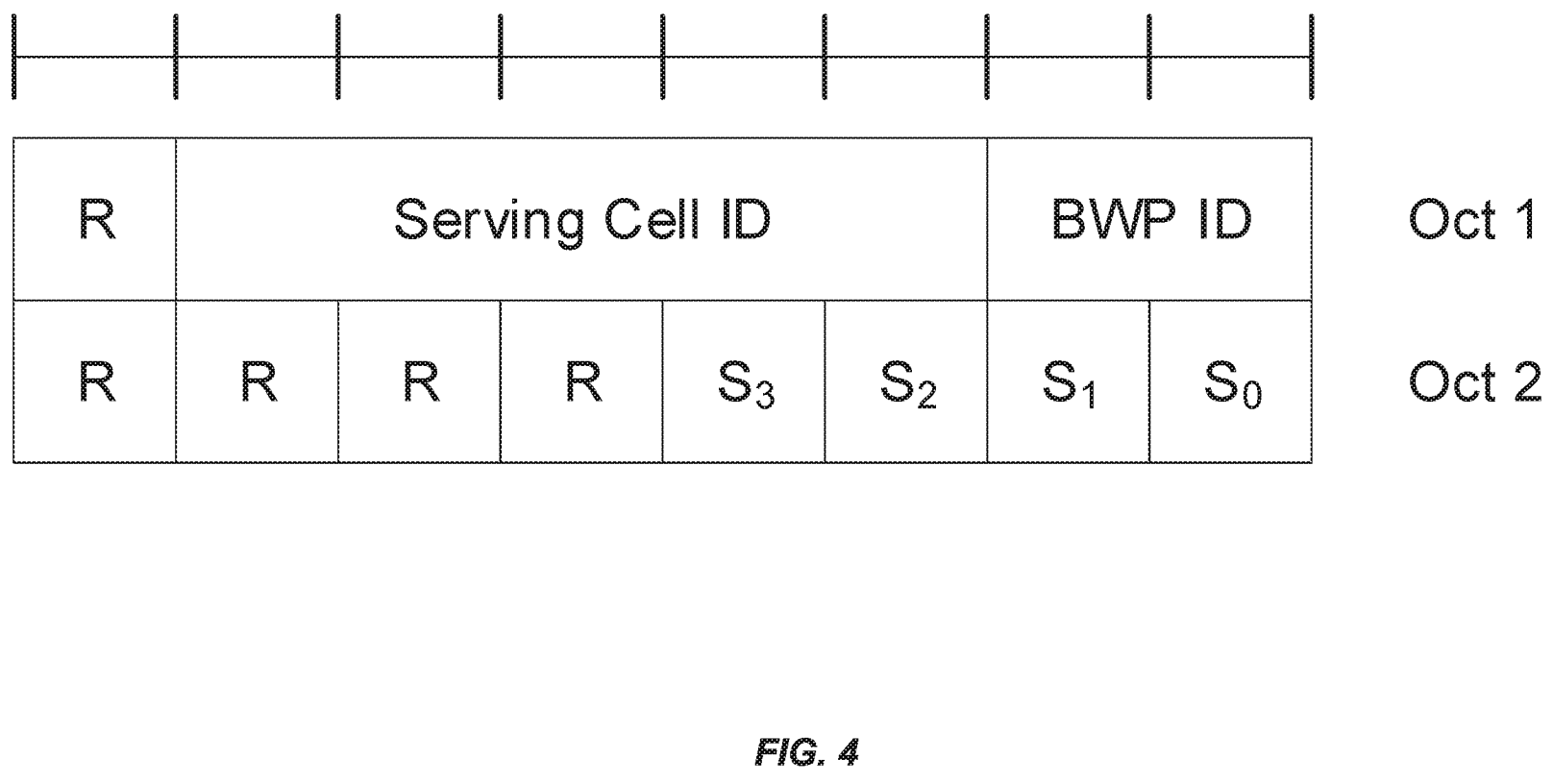

FIG. 4 illustrates a Medium Access Control (MAC) Control Element (CE) which selects one of the semi-persistent Reporting Settings for use by the UE on the PUCCH;

FIG. 5 illustrates one example of a cellular communications system in which embodiments of the present disclosure may be implemented;

FIG. 6 illustrates a method performed by a wireless device for reliable CSI feedback, according to some embodiments of the present disclosure;

FIG. 7 illustrates a method performed by a base station for reliable CSI feedback, according to some embodiments of the present disclosure;

FIG. 8 illustrates, for PUSCH and PUCCH transmission toward multiple TRPs, a PUSCH or a PUCCH may be repeated towards to different TRPs, according to some embodiments of the present disclosure;

FIG. 9 illustrates an example where a SP-CSI report is repeated twice in two slots towards two TRPs in each reporting period, according to some embodiments of the present disclosure;

FIG. 10 illustrates an example of embodiment A1, where a total of four repetitions are indicated in the TDRA while two SRIs (or UL TCI states) are indicated, according to some embodiments of the present disclosure;

FIG. 11 illustrates an example where a SP-CSI report is repeated twice in two mini-slots towards two TRPs in each reporting period, according to some embodiments of the present disclosure;

FIG. 12 illustrates a method performed by a wireless device for reliable CSI feedback, according to some embodiments of the present disclosure;

FIG. 13 illustrates an example where a SP-CSI report on PUCCH is repeated in two slots towards two TRPs in each reporting period FIG. 14 illustrates an example where the 1$^{st}$ four symbols of an 8-symbol PUCCH carrying SP CSI are sent toward TRP1 and the rest sent to TRP2

Figure 15:
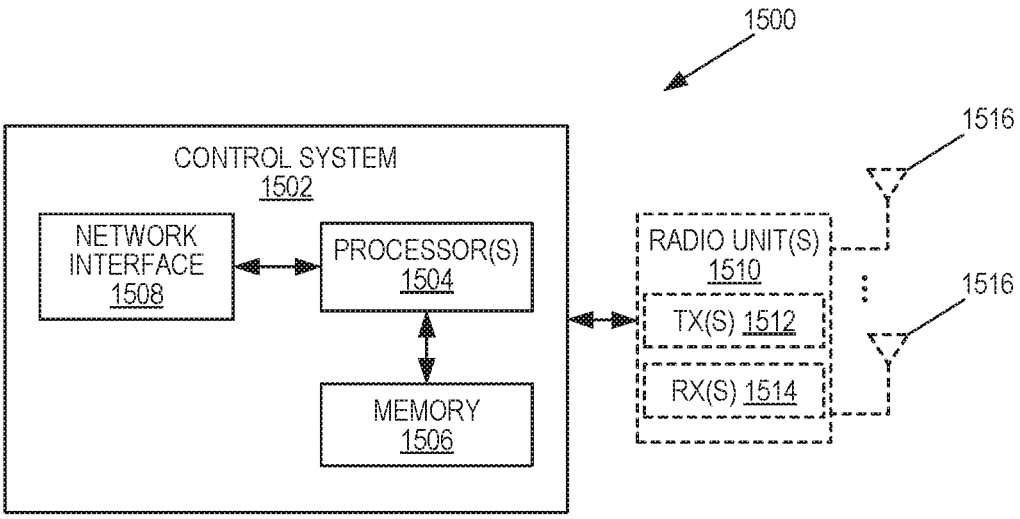
Figure 17:
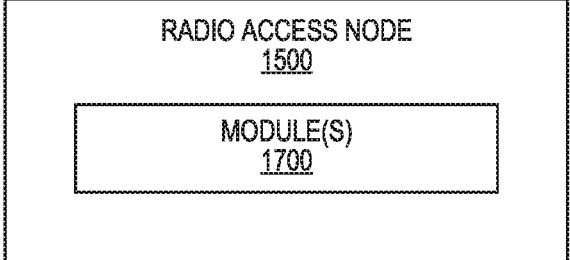
Figure 16:
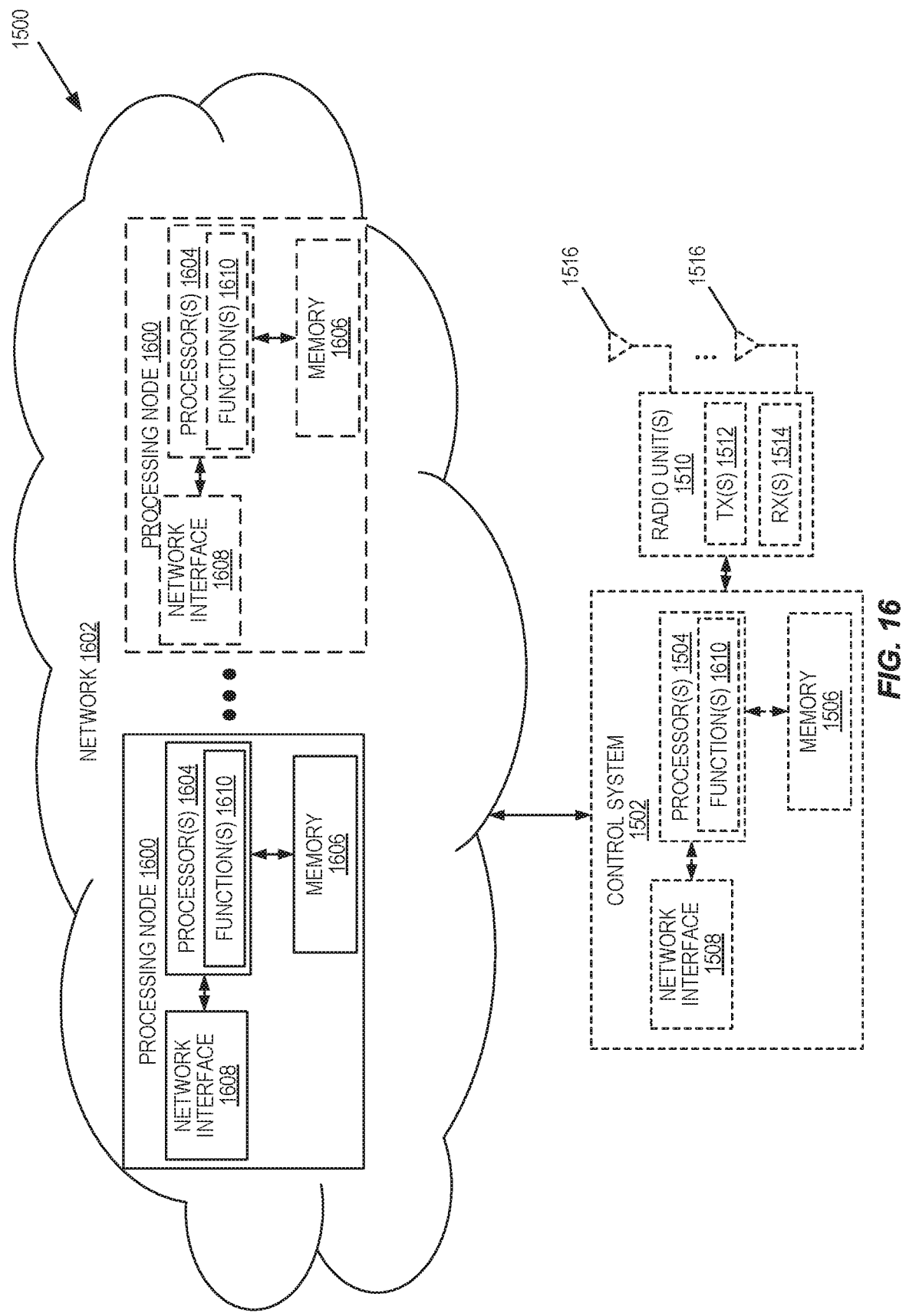
Figure 18:
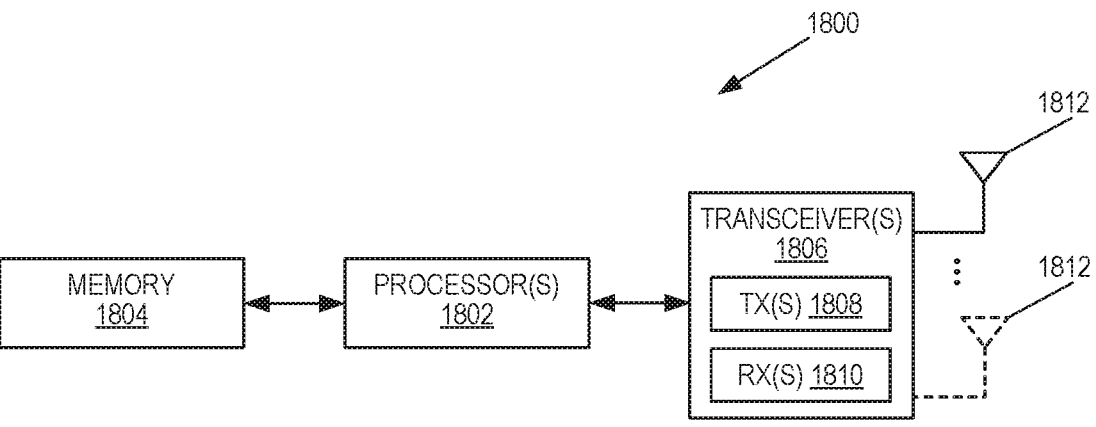
Figure 19:
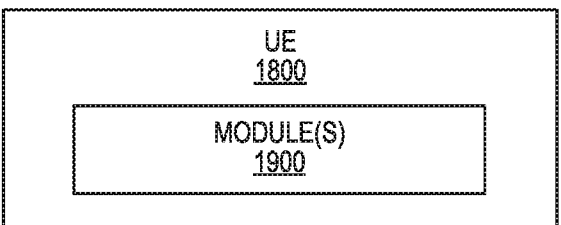
Figure 20:
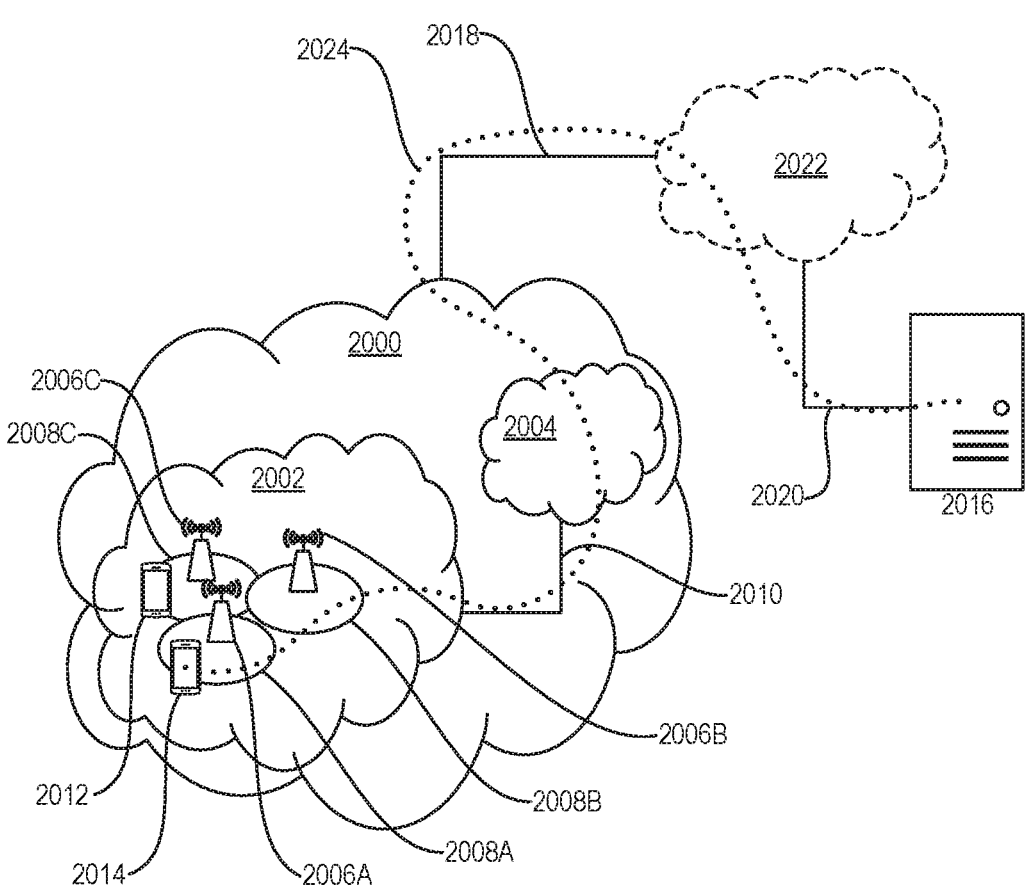
Figure 21:
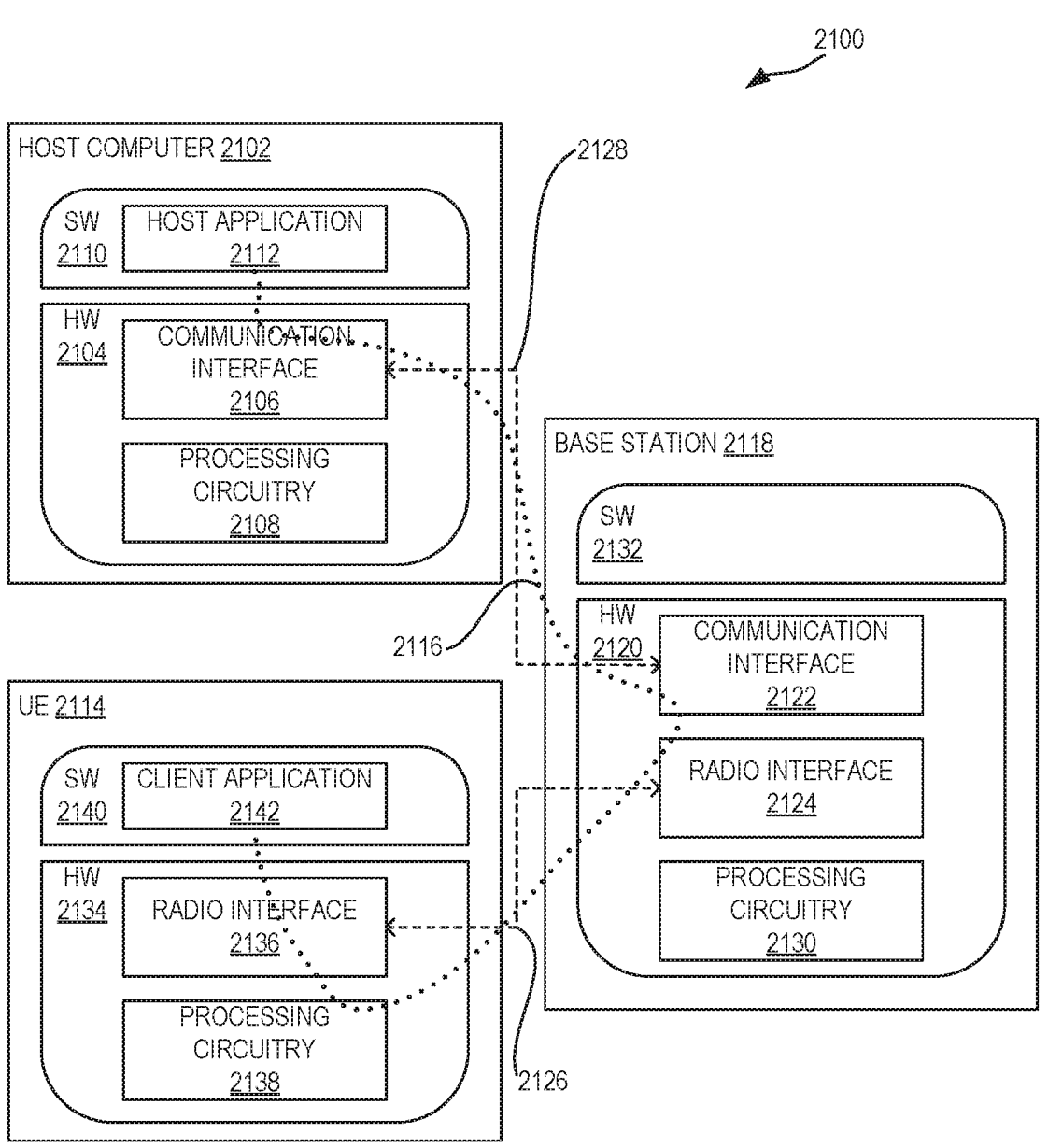

FIGS. 15 through 17 are schematic block diagrams of example embodiments of a radio access node;

FIGS. 18 and 19 are schematic block diagrams of a UE;

FIG. 20 illustrates an example embodiment of a communication system in which embodiments of the present disclosure may be implemented;

FIG. 21 illustrates example embodiments of the host computer, base station, and UE of FIG. 16; and FIGS. 22 through 25 are flow charts that illustrate example embodiments of methods implemented in a communication system such as that of FIG. 20.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node or a radio head. A TRP may be represented by a spatial relation or a TCI state in some embodiments. In some embodiments, a TRP may be using multiple TCI states. In some embodiments, each TRP intended for reception of a signal that the UE transmits in the UL is represented in specification text by a SRS Resource Indicator (SRI), a spatial relation, or a TCI state for example an UL TCI state.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

FIG. 5 illustrates one example of a cellular communications system 500 in which embodiments of the present disclosure may be implemented. In the embodiments described herein, the cellular communications system 500 is a 5G system (5GS) including a Next Generation RAN (NG-RAN) and a 5G Core (5GC). In this example, the RAN includes base stations 502-1 and 502-2, which in the 5GS include NR base stations (gNBs) and optionally next generation eNBs (ng-eNBs) (e.g., LTE RAN nodes connected to the 5GC), controlling corresponding (macro) cells 504-1 and 504-2. The base stations 502-1 and 502-2 are generally referred to herein collectively as base stations 502 and individually as base station 502. Likewise, the (macro) cells 504-1 and 504-2 are generally referred to herein collectively as (macro) cells 504 and individually as (macro) cell 504. The RAN may also include a number of low power nodes 506-1 through 506-4 controlling corresponding small cells 508-1 through 508-4. The low power nodes 506-1 through 506-4 can be small base stations (such as pico or femto base stations) or Remote Radio Heads (RRHs), or the like. Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. The cellular communications system 500 also includes a core network 510, which in the 5G System (5GS) is referred to as the 5GC. The base stations 502 (and optionally the low power nodes 506) are connected to the core network 510.

The base stations 502 and the low power nodes 506 provide service to wireless communication devices 512-1 through 512-5 in the corresponding cells 504 and 508. The wireless communication devices 512-1 through 512-5 are generally referred to herein collectively as wireless communication devices 512 and individually as wireless communication device 512. In the following description, the wireless communication devices 512 are oftentimes UEs, but the present disclosure is not limited thereto.

In the following embodiments, the term TRP is used. Note however that in 3GPP specifications, the term TRP may not be captured. Instead each TRP intended for reception of a signal that the UE transmits in the UL is represented in specification text by a SRS resource set, a SRS Resource Indicator (SRI), a spatial relation, or a TCI state for example an UL TCI state.

A method is proposed to enable repeating a CSI feedback towards multiple TRPs for Semi-Persistent CSI (SP-CSI) on PUSCH, SP-CSI on PUCCH, and periodic CSI on PUCCH. Systems and methods for reliable CSI feedback towards multiple TRPs are provided. FIG. 6 illustrates a method performed by a wireless device for reliable CSI feedback. The method includes one or more of: receiving (step 600) a configuration for one or more of: SP-CSI reporting on PUCCH comprising a first PUCCH resource activated with a first and a second spatial relation or uplink TCI states, a reporting periodicity, and/or slot offset; SP-CSI reporting on PUSCH comprising a reporting periodicity and slot offset; and periodic CSI reporting on PUCCH comprising a second PUCCH resource activated with a third and a fourth spatial relations or uplink TCI states, and a reporting periodicity and slot offset. The method might also include receiving (step 602) one or more of: an activation command activating the SP-CSI on PUCCH; an activation Downlink Control Information, DCI, activating the SP-CSI on PUSCH, wherein the DCI comprising a first and a second SRS Resource Indicators, SRIs, and a PUSCH resource. Additionally, the method might include transmitting (step 604) one or more of: a SP-CSI in the first PUCCH resource in a first transmission occasion according to the first spatial relation and in a second transmission occasion according to the second spatial relation activated for the first PUCCH resource; a periodic CSI in the second PUCCH resource in a third transmission occasion according to the third spatial relation and in a fourth transmission occasion according to the fourth spatial relation configured for the second PUCCH resource; and a SP-CSI in the PUSCH resource in a fifth transmission occasion according to the first SRI and in a sixth transmission occasion according to the second SRI.

FIG. 7 illustrates a method performed by a base station for reliable CSI feedback. The method includes one or more of: transmitting (step 700), to a wireless device, a configuration for one or more of: SP-CSI reporting on PUCCH comprising a first PUCCH resource activated with a first and a second spatial relation or uplink TCI states, a reporting periodicity, and/or slot offset; a SP-CSI reporting on PUSCH comprising a reporting periodicity and slot offset; and periodic CSI reporting on PUCCH comprising a second PUCCH resource activated with a third and a fourth spatial relations or uplink TCI states, and a reporting periodicity and slot offset.

The method might also include transmitting (step 702), to the wireless device, one or more of: an activation command activating the SP-CSI on PUCCH; an activation DCI activating the SP-CSI on PUSCH, wherein the DCI comprising a first and a second SRIs and a PUSCH resource.

The method might also include receiving (step 704), from the wireless device, one or more of: a SP-CSI in the first PUCCH resource in a first transmission occasion according to the first spatial relation and in a second transmission occasion according to the second spatial relation activated for the first PUCCH resource; a periodic CSI in the second PUCCH resource in a third transmission occasion according to the third spatial relation and in a fourth transmission according to the fourth spatial relation configured for the second PUCCH resource; and a SP-CSI in the PUSCH resource in a fifth transmission occasion according to the first SRI and in a sixth transmission occasion according to the second SRI.

The proposed solution improves reliability of SP-CSI on PUSCH, or SP-CSI or periodic CSI on PUCCH by repeating the SP-CSI or periodic CSI over multiple TRPs. The solution is particularly beneficial in FR2 scenarios as at least one TRP can receive the SP-CSI or periodic CSI when the one of the TRPs is blocked.

For PUSCH and PUCCH transmission toward multiple TRPs, a PUSCH or a PUCCH may be repeated towards to different TRPs as shown in FIG. 8. Here the transmission in the $1^{st}$ occasion is directed toward TRP1 and the transmission in the $2^{nd}$ occasion is directed toward TRP2. More reliable PUSCH or PUCCH transmission can thereby be achieved, for example when the path towards one of the TRPs is blocked due to objects along the transmission path, since the PUSCH can reach the second TRP in this case.

The SRI, spatial relation, or UL TCI state essentially provides an indicator of a spatial filter or beam that the UE should use to target an uplink transmission towards a given TRP. Furthermore, although the below embodiments are discussed using SRIs and spatial relations, the embodiments are non-limiting and can be equally applicable to cases where SRIs are replaced by UL TCI states, DL CSI-RS resources, or TCI states in general. In the following discussion, CSI reporting in a BWP of a serving cell is considered.

Basically, the UE is indicated multiple SRIs {SRI1, SRI2, . . . ) (or spatial relations) and for each SP-CSI transmission, a rule is specified to determine which of the SRI (or spatial relation) that applies for the actual SP-CSI transmission. The simplest rule is that SRI1 (or a first spatial relation) is used for the first transmission and SRI2 (or a second spatial relation) is used for the second transmission etc. SRI1 indicates a first SRS resource from a first SRS resource set which is used to transmit the spatial relation source RS for PUSCH transmission carrying SP-CSI towards TRP1. SRI2 indicates a second SRS resource from a second SRS resource set which is used to transmit the spatial relation source RS for PUSCH transmission carrying SP-CSI towards TRP1.

Slot Based SP-CSI Repetition on PUSCH to Multiple TRPs

In this embodiment, when repetition for PUSCH Type A scheduling is configured and two or more SRIs (or UL TCI states) are indicated in a DCI activating a SP-CSI report carried on PUSCH, the SP-CSI is repeated in two or more slots within a SP-CSI reporting period.

Each repetition within a SP-CSI reporting period is intended to be received by a different TRP, i.e., transmission is directed toward a different TRP. When using a number of repetitions larger than the number of TRPs, the SP-CSI repetitions can cycle among the different TRPs.

An example is shown in FIG. 9, where a SP-CSI report is repeated twice in two slots towards two TRPs in each reporting period. In this example, the SP-CSI reporting period equals to P slots. The benefit is that in case of the channel to one TRP is blocked, the SP-CSI can still be received by the other TRP, thus the reliability of SP-CSI transmission is increased.

In one embodiment, the number of repetitions the UE is transmitting within a SP-CSI reporting period is equal to the number of SRIs (or UL TCI states) indicated in the DCI activating the SP-CSI. In other words, the number of repetitions in the SP-CSI reporting period is always assumed to be equal to the number of SRIs indicated via the DCI regardless of the number of repetitions indicated by the TDRA field in the activation DCI. In this case, SP-CSI report on PUSCH is repeated on time for each SRI value indicated. In one example, when two SRIs are indicated to the UE via the activation DCI for SP-CSI on PUSCH, the UE assumes two repetitions in each SP-CSI reporting period and ignores the number of repetitions indicated by the TDRA field in the activation DCI. Stated in other words, in this embodiment, the number of SRIs indicated in the activation DCI for SP-CSI on PUSCH overrides the number of repetitions indicated by the TDRA field in the activation DCI.

In another alternative embodiment, when more than one SRI are indicated to the UE via the activation DCI for SP-CSI on PUSCH, SP-CSI report on PUSCH is transmitted using the spatial relation indicated by one of the SRIs in each SP-CSI periodicity. The SRI that is used to derive the spatial relation for a SP-CSI on PUSCH is cycled through the more than one SRIs indicated to the UE in different SP-CSI periodicities. For example, when two SRIs are indicated to the UE via the activation DCI, the first indicated SRI is used to derive the spatial relation for a SP-CSI on PUSCH on odd SP-CSI periodicities, and the second indicated SRI is used to derive the spatial relation for a SP-CSI on PUSCH on even SP-CSI periodicities.

In another embodiment, the number of repetitions the UE is transmitting within a SP-CSI reporting period is determined by both the number of SRIs as indicated in the activation DCI and the number of repetitions. The number of repetitions may be semi-statically configured via RRC, or dynamically indicated by a DCI. In a preferred example, the number of repetitions is provided by an element of the TDRA (time domain resource allocation) as indicated in the activation DCI. Hence, the content of both these fields in the activation DCI are used, together with specified rules, to determine how and how many times the UE shall transmit the repeated SP-CSI report.

The number of repetitions is in this case configured in the PUSCH TDRA row, which is selected by the TDRA field in the activation DCI. The TDRA table containing multiple rows are provided by RRC signaling to the UE.

In one embodiment A1, the value indicated by TDRA row is the total number of transmissions (across all values of SRIs) of SP-CSI in the SP-CSI reporting period. For example, the number of repetitions configured in the selected TDRA row as indicated by DCI applies only if more than one SRI are indicated in the DCI. Moreover, in case the total number of repetitions is indicated by the TDRA row, and if the number of repetitions are more than the number of SRIs (or UL TCI states) indicated, the repetition may be cycled over the TRPs so that at least one of the SRI values is utilized for more than one transmission. That TRP thus receives the SP-CSI report more than one time during the SP-CSI reporting period In an alternative embodiment A2, the value indicated by TDRA row is the number of transmissions of the SP-CSI for each SRI value. If the value indicated by TDRA row is two or larger, the repetition may be cycled over the TRPs so that at least one of the SRI values is utilized for more than one transmission.

An example of the former embodiment A1 is shown in FIG. 10, where a total of four repetitions are indicated in the TDRA while two SRIs (or UL TCI states) are indicated. The SP-CSI is repeated 4 times in 4 slots to the two TRPs in a cyclic manner. Alternatively, it may be specified that the order of these transmissions are arranged differently, e.g., the first two repetitions in slots n and n+1 may be sent towards TRP1 (i.e., associated with the first SRI) and the next two repetitions in slot n+2 and n+3 may be sent towards TRP2 (associated with the second SRI).

In yet another embodiment, the order of transmissions towards different TRPs are configured to the UE from the network using e.g., higher layer RRC signaling. For example, the order {SRI1, SRI1, SRI2, SRI2, . . . } or the order {SRI1, SRI2, SRI1, SRI2, . . . ) may be configured, where these have different advantages depending on whether blocking probability is the same for the two links or if one link have a smaller blocking probability than the other.

For both embodiment A1 and A2, the same pattern may be repeated in each SP-CSI reporting period.

Mini-Slot Based SP-CSI Repetition on PUSCH to Multiple TRPs

In this embodiment, when PUSCH repetition Type B and two or more SRIs (or UL TCI states) are indicated in a DCI activating a SP-CSI on PUSCH, the SP-CSI is repeated in two or more mini-slots within a SP-CSI reporting period, where a mini-slot contains a number of OFDM symbols and is the same as a nominal repetition with a starting symbol and length. Each repetition is toward a different TRP. An example is shown in FIG. 11, where a SP-CSI report is repeated twice in two mini-slots towards two TRPs in each reporting period.

Similar to PUSCH repetition Type A, in one embodiment, the number of repetitions may equal to the number of SRIs (or UL TCI Fstates) indicated in the DCI activating the SP-CSI. In another embodiment, the number of repetitions may be determined by both the number of SRIs and the number of repetitions configured in the PUSCH TDRA row selected by the TDRA field in the activation DCI. The Embodiments A1 and A2 in the previous section on how to use the DCI fields of TDRA row and SRI to determine the repetitions applies equally well to SP-CSI on PUSCH with PUSCH repetition type B. In one example, the number of repetitions configured in the selected TDRA row applies only if more than one SRI are indicated in the DCI.

The SP CSI may be sent in a nominal repetition occasion only if it is the same as the actual repetition occasion, i.e., the nominal repetition is not segmented or omitted.

In some embodiments, when SP CSI on PUSCH is transmitted towards to different TRPs, two different power control parameter sets may be provided to the UE so that each of the set of power control parameters may be used by the UE when transmitting to each of the TRPs. The two different sets of power control parameters may be provided as part of the CSI-ReportConfig information element in 3GPP TS 38.331. An example of this embodiment is shown below, where p0alphaList provides up to two sets of power control parameters.

```
    semiPersistentOnPUSCH         SEQUENCE {
        reportSlotConfig              ENUMERATED
    {sl5, sl10, sl20, sl40, sl80, sl160, sl320},
        reportSlotOffsetList          SEQUENCE (SIZE
    (1.. maxNrofUL-Allocations)) OF INTEGER (0..32),
        p0alphaList                   SEQUENCE (SIZE
    (1.. 2)) OF P0-PUSCH-AlphaSetId
    },
```

FIG. 12 illustrates a method performed by a wireless device for reliable CSI feedback, according to some embodiments of the present disclosure. The wireless device receives the configuration for SP-CSI reporting on PUSCH comprising a reporting periodicity and slot offset (step 1200). The wireless device receives the activation DCI activating the SP-CSI on PUSCH, where the DCI comprises the first and the second SRIs and the PUSCH resource (step 1202). The wireless device transmits the SP-CSI in the PUSCH resource in the fifth transmission occasion according to the first SRI and in the sixth transmission occasion according to the second SRI (step 1204).

SP-CSI Repetition on PUCCH to Multiple TRPs

Similar to SP CSI on PUSCH, when a PUCCH resource for a SP CSI on PUCCH is activated with two or more spatial relations (or UL TCI states), the SP-CSI is repeated in two or more slots within a SP-CSI reporting period. Each repetition is toward a different TRP over the same PUCCH resource. Each TRP is associated with a spatial relation or a UL TCI state. An example is shown in FIG. 13, where a SP-CSI report is repeated in two slots towards two TRPs in each reporting period. In this example, the SP-CSI reporting period equals to P slots. The activation of two or more spatial relations (or UL TCI states) for a PUCCH resource to be used for SP-CSI reporting is achieved via a MAC CE that is separate from the MAC CE that activates the SP-CSI reporting on PUCCH. The benefit of using different MAC CEs for activating the SP-CSI reporting on PUCCH and for activating two or more spatial relations (or UL TCI states) for a PUCCH resource is that it allows independent control of when to activate the SP-CSI reporting on PUCCH and how many TRPs to transmit the SP-CSI towards.

In one embodiment, the number of repetitions is equal to the number of spatial relations or UL TCI states activated. In another embodiment, the number of repetitions may be explicitly configured in the associated PUCCH resources.

As an example, the PUCCH resource configuration can be enhanced as illustrated below, to provide multi-TRP indication (via SpatialRelationList) and the number of repetitions for this PUCCH resource (via NrRepetitions).

```
PUCCH-CSI-Resource ::=              SEQUENCE {
    uplinkBandwidthPartId               BWP-Id,
    pucch-Resource                      PUCCH-ResourceId
}
PUCCH-Resource ::=                  SEQUENCE {
    pucch-ResourceId                    PUCCH-ResourceId,
    startingPRB                         PRB-Id,
    intraSlotFrequencyHopping           ENUMERATED { enabled
                                          OPTIONAL, --
}
Need R
    secondHopPRB                        PRB-Id
OPTIONAL, -- Need R
    format                              CHOICE {
        format0                            PUCCH-format0,
        format1                            PUCCH-format1,
        format2                            PUCCH-format2,
        format3                            PUCCH-format3,
        format4                            PUCCH-format4
    }
    SpatialRelationList    SEQUENCE (SIZE
    (1..maxNrofSpatialRelationInfoMultiTRP-r16)) OF PUCCH-
SpatialRelationInfoId    OPTIONAL,
    NrRepetitionsENUMERATED {n1, n2, n4, n8, n12, n16} OPTIONAL
}
```

Alternatively, when two or more PUCCH resources each with an associated spatial relation or UL TCI state are configured for a SP CSI on PUCCH in a BWP, the SP-CSI is repeated in two or more slots within a SP-CSI reporting period. Each repetition is toward a different TRP associated with one of the two or more spatial relations or UL TCI states. The number of repetitions is equal to the number of PUCCH resources.

In yet another embodiment, instead of repetition in different slots, the SP CSI repetition may be within a slot, i.e., intra-slot repetition.

In a further embodiment, instead of intra-slot repetition, the SP CSI may be hopped between TRPs in a slot in which some PUCCH symbols carrying the SP CSI are transmitted to one TRP while the rest of the symbols are sent to a different TRP. An example is shown in FIG. 14, where the $1^{st}$ four symbols of an 8-symbol PUCCH carrying SP CSI are sent toward TRP1 and the rest sent to TRP2.

Other Activation and Deactivation Mechanism of SP-CSI on PUCCH

In the above discussion, the DCI-based activation and deactivation mechanism of SP-CSI on PUSCH is assumed to be an UE-specific DCI that schedules PUSCH (aka, UL DCI), e.g., DCI format 0_1 and 0_2. For SP-CSI on PUCCH, the activation and deactivation is via the mechanism of MAC CE.

Alternatively or additionally, other DCI-based activation and deactivation mechanisms can be used, as discussed below.

DL DCI

In one embodiment, the activation mechanism is a UE-specific DCI that schedules PDSCH (aka, DL DCI), e.g., DCI format 1_1 and 1_2. A DL DCI can trigger SP-CSI report on PUCCH, although not on PUSCH. To indicate that the DL DCI is sent for activation of SP-CSI report, CRC parity bits of the DCI format are scrambled with a SP-CSI-RNTI.

The PUCCH resources for SP-CSI can be provided in numerous ways.

In one method, the PUCCH resource is provided by the PUCCH resource indicator (PRI) field of DCI, and the activation DL DCI does not schedule any PDSCH.

In another method, the PUCCH resource is provided by the RRC parameter semiPersistentOnPUCCH.

A "CSI request" field needs to be provided in the DCI format.

In one method, a new "CSI request" field is added to the DL DCI format, so that gNB use it to select a SP-CSI triggering state. A codepoint of the CSI request field in the DCI is mapped to a SP-CSI triggering state according to the order of the positions of the configured trigger states in CSI-SemiPersistentOn-PUSCH-TriggerStateList, with codepoint '0' mapped to the triggering state in the first position.

Alternatively, the "CSI request" field is not introduced as a new field. Rather, an existing field is reused as "CSI request" field. For example, re-purpose the "SRS request" field as the "CSI request" field.

The "Antenna Port(s)" field in the DL DCI can be used to provide information for SP-CSI repetition across multiple TRPs.

If "Antenna Port(s)" field has size of 0 bits, then the SP-CSI is sent to a single TRP only, for example, TRP #0.

If "Antenna Port(s)" field has size of 4 or more bits, then the bits can provide information about SP-CSI repetition and/or cyclic TRP pattern. For example, two bits are used to indicate the number of SP-CSI repetitions, and two bits are used to indicate the first TRP and TRP sequence to realize the cyclic TRP pattern.

For instance, 2 bits are used to select 1 out of 4 possible values for number of SP-CSI repetitions, {1, 2, 4, 8}.

For instance, 2 bits are used to select 1 out of 4 possible sequence to cycle through the TRPs, assuming two TRPs: {{0, 1}, {1, 0}, {0, 0, 1, 1}, {1, 1, 0, 0}}. For example, if TRP sequence {1, 0} is selected for 8 repetitions, then the TRP used for SP-CSI transmission is: 1, 0, 1, 0.

The deactivation mechanism can also be a UE-specific DCI, where the CRC parity bits of the DCI formats 1_0,1_1 or 1_2 are scrambled with a SP-CSI-RNTI.

When using the DL DCI to activate and deactivate, special field values in the DCI are used to validate the SP-CSI activation and deactivation. As an example, the fields shown in Table 1 can be used to validate the activation, and the fields shown in Table 2 can be used to validate the deactivation.

TABLE 1

| Special fields for semi-persistent CSI activation PDCCH validation with DL DCI | | | |
| --- | --- | --- | --- |
| | DCI format 0_1 | DCI format 1_1 | DCI format 1_2 |
| HARQ process number | | set to all '0's | set to all '0's |
| Redundancy version | | For the enabled transport block: set to all '0's | set to all '0's |
| Frequency domain resource assignment | set to all '1's | | |

TABLE 2

| Special fields for semi-persistent CSI deactivation PDCCH validation with DL DCI | | |
| --- | --- | --- |
| | DCI format 0_1 | DCI format 1_1/1_2 |
| HARQ process number | set to all '0's | set to all '0's |
| Modulation and coding scheme | set to all '1's | set to all '1's |
| Frequency domain resource assignment | set to all '1's | set to all '0's for FDRA Type 0 or for dynamicSwitch set to all '1's for FDRA Type 1 |
| Redundancy version | set to all '0's | set to all '0's |

Group Common DCI

In another embodiment, a group common DCI can be used to activate and/or deactivate SP-CSI on PUCCH.

For example, a modified DCI format 2_3, or a new DCI format (e.g., DCI format 2_7) can be used for SP-CSI activation/deactivation. To indicate that the DL DCI is sent for activation/activation of SP-CSI report, CRC parity bits of the DCI format are scrambled with the corresponding group-common RNTI, e.g., TPC-SRS-RNTI for DCI format 2_3.

The DCI can carry a SP-CSI field for each UE, where the SP-CSI is composed of one or more bits. For example, four bits of {S0, S1, S2, 53} are sent to a UE, for activation/deactivation of SP-CSI in the same BWP of the same serving cell where the DCI is sent. The $S_i$ (i=0, 1, 2, 3) indicates the activation/deactivation status of the Semi-Persistent CSI report configuration within a list of CSI-ReportConfigs. $S_0$ refers to the report configuration which includes PUCCH resources for SP CSI reporting in the indicated BWP and has the lowest CSI-ReportConfigId within the list with type set to semiPersistentOnPUCCH, $S_1$ to the report configuration which includes PUCCH resources for SP CSI reporting in the indicated BWP and has the second lowest CSI-ReportConfigId and so on. The $S_i$ is set to 1 to indicate that the corresponding Semi-Persistent CSI report configuration shall be activated. The $S_i$ is set to 0 to indicate that the corresponding Semi-Persistent CSI report configuration i shall be deactivated;

Activation and Deactivation Mechanism to Support P-CSI on PUCCH

Parts of the embodiments covered above for SP-CSI on PUCCH can also be extended to P-CSI on PUCCH. In this case, when a PUCCH resource for a P-CSI on PUCCH is configured with two or more spatial relations (or UL TCI states), the P-CSI is repeated in two or more slots within a P-CSI reporting period. Each repetition is toward a different TRP over the same PUCCH resource. Each TRP is associated with a spatial relation or a UL TCI state. The example in FIG. 13 is equally valid for this case where SP-CSI in the figure is replaced by P-CSI. In this example, a P-CSI report is repeated in two slots towards two TRPs in each reporting period. In this example, the P-CSI reporting period equals to P slots. The activation of two or more spatial relations (or UL TCI states) for a PUCCH resource to be used for P-CSI reporting is achieved via a MAC CE. Note that one difference from the SP-CSI on PUCCH case here is that since the CSI is periodic, there is no MAC CE for activating the CSI reporting on PUCCH (i.e., CSI reporting on PUCCH is periodic).

In one embodiment, the number of repetitions is equal to the number of spatial relations or UL TCI states activated for the PUCCH resource carrying the P-CSI. In another embodiment, the number of repetitions may be explicitly configured in the associated PUCCH resources.

In another embodiment, when more than one spatial relation (or UL TCI state) is activated for the PUCCH resource carrying P-CSI, P-CSI report on PUCCH is transmitted using one of the activated spatial relations (or UL TCI states) in each P-CSI periodicity. The spatial relation (or UL TCI state) that is used for a P-CSI on PUCCH is cycled through the more than one spatial relation (or UL TCI states) indicated to the UE in different P-CSI periods. For example, when two spatial relations (or two UL TCI states) are activated, the first activated spatial relation (or UL TCI state) is used for a P-CSI in odd SP-CSI periods, and the second activated spatial relation (or UL TCI state) is used for a P-CSI in even P-CSI periods.

FIG. 15 is a schematic block diagram of a radio access node 1500 according to some embodiments of the present disclosure. Optional features are represented by dashed boxes. The radio access node 1500 may be, for example, a base station 502 or 506 or a network node that implements all or part of the functionality of the base station 502 or gNB described herein. As illustrated, the radio access node 1500 includes a control system 1502 that includes one or more processors 1504 (e.g., Central Processing Units (CPUs), Application Specific Integrated Circuits (ASICs), Field Programmable Gate Arrays (FPGAs), and/or the like), memory 1506, and a network interface 1508. The one or more processors 1504 are also referred to herein as processing circuitry. In addition, the radio access node 1500 may include one or more radio units 1510 that each includes one or more transmitters 1512 and one or more receivers 1514 coupled to one or more antennas 1516. The radio units 1510 may be referred to or be part of radio interface circuitry. In some embodiments, the radio unit(s) 1510 is external to the control system 1502 and connected to the control system 1502 via, e.g., a wired connection (e.g., an optical cable). However, in some other embodiments, the radio unit(s) 1510 and potentially the antenna(s) 1516 are integrated together with the control system 1502. The one or more processors 1504 operate to provide one or more functions of a radio access node 1500 as described herein. In some embodiments, the function(s) are implemented in software that is stored, e.g., in the memory 1506 and executed by the one or more processors 1504.

FIG. 16 is a schematic block diagram that illustrates a virtualized embodiment of the radio access node 1500 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1500 in which at least a portion of the functionality of the radio access node 1500 is implemented as a virtual component(s) (e.g., via a virtual machine(s) executing on a physical processing node(s) in a network(s)). As illustrated, in this example, the radio access node 1500 may include the control system 1502 and/or the one or more radio units 1510, as described above. The control system 1502 may be connected to the radio unit(s) 1510 via, for example, an optical cable or the like. The radio access node 1500 includes one or more processing nodes 1600 coupled to or included as part of a network(s) 1602. If present, the control system 1502 or the radio unit(s) are connected to the processing node(s) 1600 via the network 1602. Each processing node 1600 includes one or more processors 1604 (e.g., CPUs, ASICs, FPGAs, and/or the like), memory 1606, and a network interface 1608.

In this example, functions 1610 of the radio access node 1500 described herein are implemented at the one or more processing nodes 1600 or distributed across the one or more processing nodes 1600 and the control system 1502 and/or the radio unit(s) 1510 in any desired manner. In some particular embodiments, some or all of the functions 1610 of the radio access node 1500 described herein are implemented as virtual components executed by one or more virtual machines implemented in a virtual environment(s) hosted by the processing node(s) 1600. As will be appreciated by one of ordinary skill in the art, additional signaling or communication between the processing node(s) 1600 and the control system 1502 is used in order to carry out at least some of the desired functions 1610. Notably, in some embodiments, the control system 1502 may not be included, in which case the radio unit(s) 1510 communicate directly with the processing node(s) 1600 via an appropriate network interface(s).

In some embodiments, a computer program including instructions which, when executed by at least one processor, causes the at least one processor to carry out the functionality of radio access node 1500 or a node (e.g., a processing node 1600) implementing one or more of the functions 1610 of the radio access node 1500 in a virtual environment according to any of the embodiments described herein is provided.

In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 17 is a schematic block diagram of the radio access node 1500 according to some other embodiments of the present disclosure. The radio access node 1500 includes one or more modules 1700, each of which is implemented in software. The module(s) 1700 provide the functionality of the radio access node 1500 described herein. This discussion is equally applicable to the processing node 1600 of FIG. 16 where the modules 1700 may be implemented at one of the processing nodes 1600 or distributed across multiple processing nodes 1600 and/or distributed across the processing node(s) 1600 and the control system 1502.

FIG. 18 is a schematic block diagram of a wireless communication device 1800 according to some embodiments of the present disclosure. As illustrated, the wireless communication device 1800 includes one or more processors 1802 (e.g., CPUs, ASICs, FPGAs, and/or the like), memory 1804, and one or more transceivers 1806 each including one or more transmitters 1808 and one or more receivers 1810 coupled to one or more antennas 1812. The transceiver(s) 1806 includes radio-front end circuitry connected to the antenna(s) 1812 that is configured to condition signals communicated between the antenna(s) 1812 and the processor(s) 1802, as will be appreciated by on of ordinary skill in the art. The processors 1802 are also referred to herein as processing circuitry. The transceivers 1806 are also referred to herein as radio circuitry. In some embodiments, the functionality of the wireless communication device 1800 described above may be fully or partially implemented in software that is, e.g., stored in the memory 1804 and executed by the processor(s) 1802. Note that the wireless communication device 1800 may include additional components not illustrated in FIG. 18 such as, e.g., one or more user interface components (e.g., an input/output interface including a display, buttons, a touch screen, a microphone, a speaker(s), and/or the like and/or any other components for allowing input of information into the wireless communication device 1800 and/or allowing output of information from the wireless communication device 1800), a power supply (e.g., a battery and associated power circuitry), etc.

In some embodiments, a computer program including instructions which, when executed by at least one processor, causes the at least one processor to carry out the functionality of the wireless communication device 1800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 19 is a schematic block diagram of the wireless communication device 1800 according to some other embodiments of the present disclosure. The wireless communication device 1800 includes one or more modules 1900, each of which is implemented in software. The module(s) 1900 provide the functionality of the wireless communication device 1800 described herein.

With reference to FIG. 20, in accordance with an embodiment, a communication system includes a telecommunication network 2000, such as a 3GPP-type cellular network, which comprises an access network 2002, such as a RAN, and a core network 2004. The access network 2002 comprises a plurality of base stations 2006A, 2006B, 2006C, such as Node Bs, eNBs, gNBs, or other types of wireless Access Points (APs), each defining a corresponding coverage area 2008A, 2008B, 2008C. Each base station 2006A, 2006B, 2006C is connectable to the core network 2004 over a wired or wireless connection 2010. A first UE 2012 located in coverage area 2008C is configured to wirelessly connect to, or be paged by, the corresponding base station 2006C. A second UE 2014 in coverage area 2008A is wirelessly connectable to the corresponding base station 2006A. While a plurality of UEs 2012, 2014 are illustrated in this example, the disclosed embodiments are equally applicable to a situation where a sole UE is in the coverage area or where a sole UE is connecting to the corresponding base station 2006.

The telecommunication network 2000 is itself connected to a host computer 2016, which may be embodied in the hardware and/or software of a standalone server, a cloud-implemented server, a distributed server, or as processing resources in a server farm. The host computer 2016 may be under the ownership or control of a service provider, or may be operated by the service provider or on behalf of the service provider. Connections 2018 and 2020 between the telecommunication network 2000 and the host computer 2016 may extend directly from the core network 2004 to the host computer 2016 or may go via an optional intermediate network 2022. The intermediate network 2022 may be one of, or a combination of more than one of, a public, private, or hosted network; the intermediate network 2022, if any, may be a backbone network or the Internet; in particular, the intermediate network 2022 may comprise two or more sub-networks (not shown).

The communication system of FIG. 20 as a whole enables connectivity between the connected UEs 2012, 2014 and the host computer 2016. The connectivity may be described as an Over-the-Top (OTT) connection 2024. The host computer 2016 and the connected UEs 2012, 2014 are configured to communicate data and/or signaling via the OTT connection 2024, using the access network 2002, the core network 2004, any intermediate network 2022, and possible further infrastructure (not shown) as intermediaries. The OTT connection 2024 may be transparent in the sense that the participating communication devices through which the OTT connection 2024 passes are unaware of routing of uplink and downlink communications. For example, the base station 2006 may not or need not be informed about the past routing of an incoming downlink communication with data originating from the host computer 2016 to be forwarded (e.g., handed over) to a connected UE 2012. Similarly, the base station 2006 need not be aware of the future routing of an outgoing uplink communication originating from the UE 2012 towards the host computer 2016.

Example implementations, in accordance with an embodiment, of the UE, base station, and host computer discussed in the preceding paragraphs will now be described with reference to FIG. 21. In a communication system 2100, a host computer 2102 comprises hardware 2104 including a communication interface 2106 configured to set up and maintain a wired or wireless connection with an interface of a different communication device of the communication system 2100. The host computer 2102 further comprises processing circuitry 2108, which may have storage and/or processing capabilities. In particular, the processing circuitry 2108 may comprise one or more programmable processors, ASICs, FPGAs, or combinations of these (not shown) adapted to execute instructions. The host computer 2102 further comprises software 2110, which is stored in or accessible by the host computer 2102 and executable by the processing circuitry 2108. The software 2110 includes a host application 2112. The host application 2112 may be operable to provide a service to a remote user, such as a UE 2114 connecting via an OTT connection 2116 terminating at the UE 2114 and the host computer 2102. In providing the service to the remote user, the host application 2112 may provide user data which is transmitted using the OTT connection 2116.

The communication system 2100 further includes a base station 2118 provided in a telecommunication system and comprising hardware 2120 enabling it to communicate with the host computer 2102 and with the UE 2114. The hardware 2120 may include a communication interface 2122 for setting up and maintaining a wired or wireless connection with an interface of a different communication device of the communication system 2100, as well as a radio interface 2124 for setting up and maintaining at least a wireless connection 2126 with the UE 2114 located in a coverage area (not shown in FIG. 21) served by the base station 2118. The communication interface 2122 may be configured to facilitate a connection 2128 to the host computer 2102. The connection 2128 may be direct or it may pass through a core network (not shown in FIG. 21) of the telecommunication system and/or through one or more intermediate networks outside the telecommunication system. In the embodiment shown, the hardware 2120 of the base station 2118 further includes processing circuitry 2130, which may comprise one or more programmable processors, ASICs, FPGAs, or combinations of these (not shown) adapted to execute instructions. The base station 2118 further has software 2132 stored internally or accessible via an external connection.

The communication system 2100 further includes the UE 2114 already referred to. The UE's 2114 hardware 2134 may include a radio interface 2136 configured to set up and maintain a wireless connection 2126 with a base station serving a coverage area in which the UE 2114 is currently located. The hardware 2134 of the UE 2114 further includes processing circuitry 2138, which may comprise one or more programmable processors, ASICs, FPGAs, or combinations of these (not shown) adapted to execute instructions. The UE 2114 further comprises software 2140, which is stored in or accessible by the UE 2114 and executable by the processing circuitry 2138. The software 2140 includes a client application 2142. The client application 2142 may be operable to provide a service to a human or non-human user via the UE 2114, with the support of the host computer 2102. In the host computer 2102, the executing host application 2112 may communicate with the executing client application 2142 via the OTT connection 2116 terminating at the UE 2114 and the host computer 2102. In providing the service to the user, the client application 2142 may receive request data from the host application 2112 and provide user data in response to the request data. The OTT connection 2116 may transfer both the request data and the user data. The client application 2142 may interact with the user to generate the user data that it provides.

It is noted that the host computer 2102, the base station 2118, and the UE 2114 illustrated in FIG. 21 may be similar or identical to the host computer 2016, one of the base stations 2006A, 2006B, 2006C, and one of the UEs 2012, 2014 of FIG. 20, respectively. This is to say, the inner workings of these entities may be as shown in FIG. 21 and independently, the surrounding network topology may be that of FIG. 20.

In FIG. 21, the OTT connection 2116 has been drawn abstractly to illustrate the communication between the host computer 2102 and the UE 2114 via the base station 2118 without explicit reference to any intermediary devices and the precise routing of messages via these devices. The network infrastructure may determine the routing, which may be configured to hide from the UE 2114 or from the service provider operating the host computer 2102, or both. While the OTT connection 2116 is active, the network infrastructure may further take decisions by which it dynamically changes the routing (e.g., on the basis of load balancing consideration or reconfiguration of the network).

The wireless connection 2126 between the UE 2114 and the base station 2118 is in accordance with the teachings of the embodiments described throughout this disclosure. One or more of the various embodiments improve the performance of OTT services provided to the UE 2114 using the OTT connection 2116, in which the wireless connection 2126 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 2116 between the host computer 2102 and the UE 2114, in response to variations in the measurement results. The measurement procedure and/or the network functionality for reconfiguring the OTT connection 2116 may be implemented in the software 2110 and the hardware 2104 of the host computer 2102 or in the software 2140 and the hardware 2134 of the UE 2114, or both. In some embodiments, sensors (not shown) may be deployed in or in association with communication devices through which the OTT connection 2116 passes; the sensors may participate in the measurement procedure by supplying values of the monitored quantities exemplified above, or supplying values of other physical quantities from which the software 2110, 2140 may compute or estimate the monitored quantities. The reconfiguring of the OTT connection 2116 may include message format, retransmission settings, preferred routing, etc.; the reconfiguring need not affect the base station 2118, and it may be unknown or imperceptible to the base station 2118. Such procedures and functionalities may be known and practiced in the art. In certain embodiments, measurements may involve proprietary UE signaling facilitating the host computer 2102's measurements of throughput, propagation times, latency, and the like. The measurements may be implemented in that the software 2110 and 2140 causes messages to be transmitted, in particular empty or 'dummy' messages, using the OTT connection 2116 while it monitors propagation times, errors, etc.

Figures 22, 23:
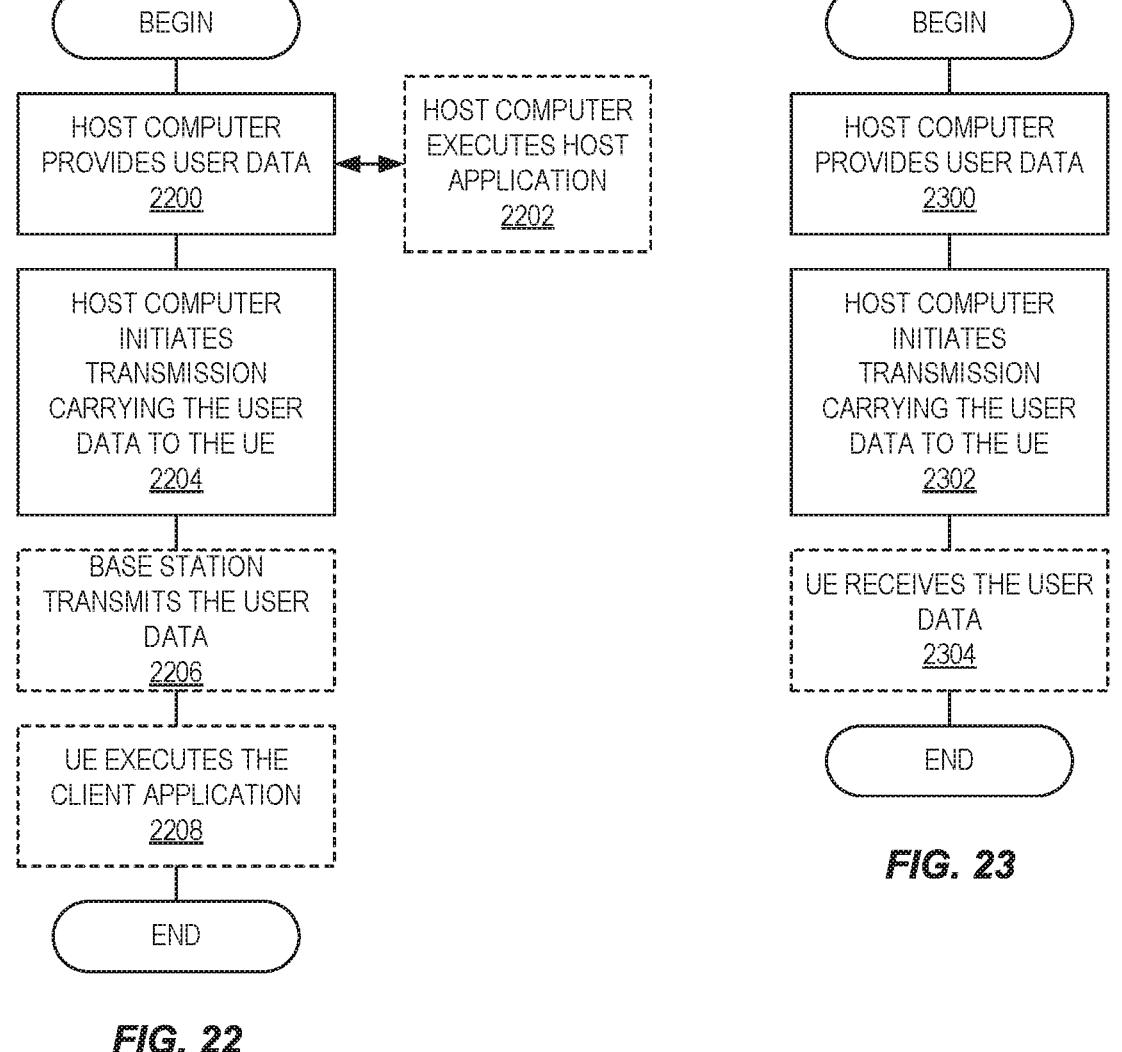

FIG. 22 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 22 will be included in this section. In step 2200, the host computer provides user data. In sub-step 2202 (which may be optional) of step 2200, the host computer provides the user data by executing a host application. In step 2204, the host computer initiates a transmission carrying the user data to the UE. In step 2206 (which may be optional), the base station transmits to the UE the user data which was carried in the transmission that the host computer initiated, in accordance with the teachings of the embodiments described throughout this disclosure. In step 2208 (which may also be optional), the UE executes a client application associated with the host application executed by the host computer.

FIG. 23 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 23 will be included in this section. In step 2300 of the method, the host computer provides user data. In an optional sub-step (not shown) the host computer provides the user data by executing a host application. In step 2302, the host computer initiates a transmission carrying the user data to the UE. The transmission may pass via the base station, in accordance with the teachings of the embodiments described throughout this disclosure. In step 2304 (which may be optional), the UE receives the user data carried in the transmission.

Figures 24, 25:
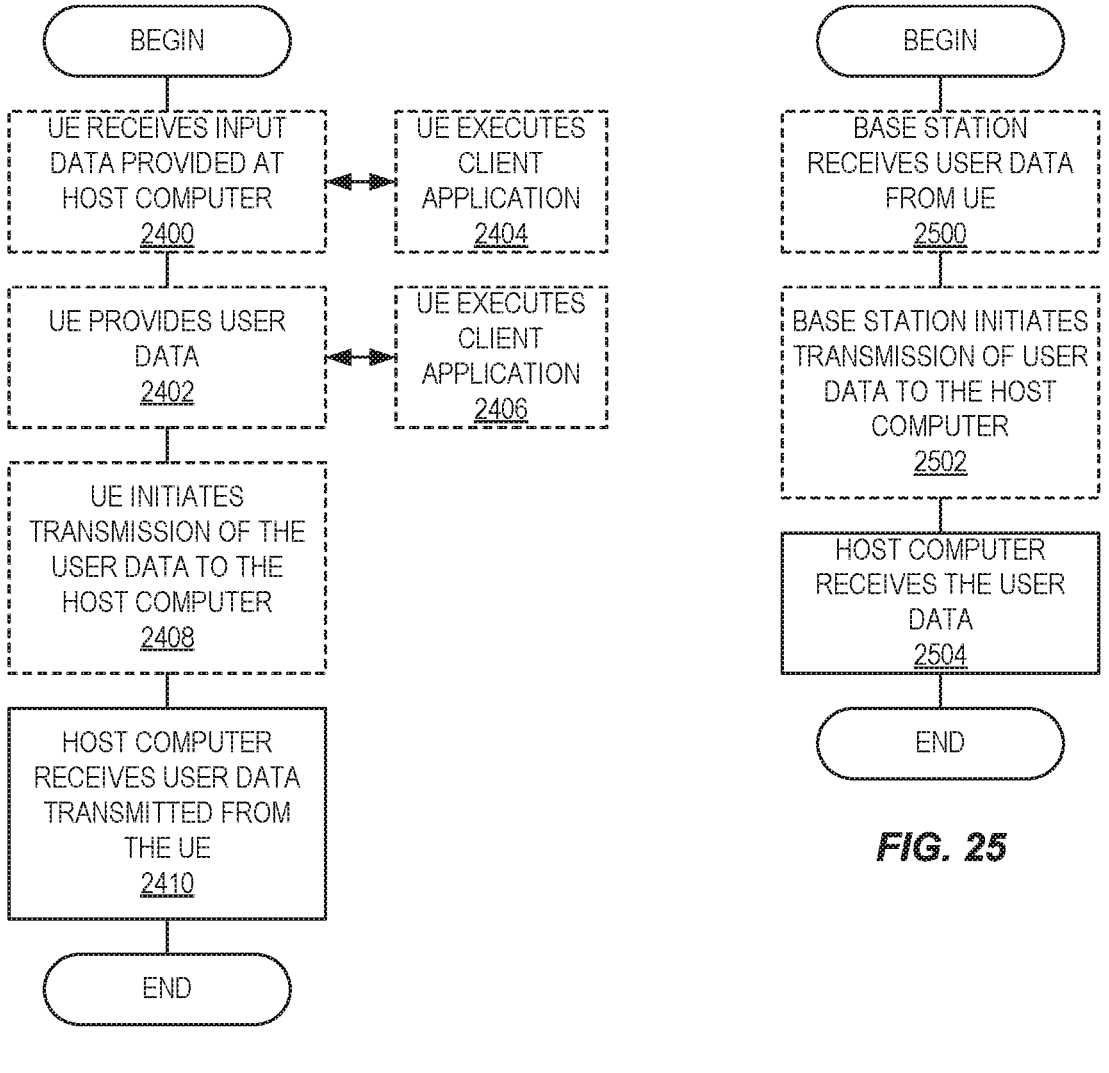

FIG. 24 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 24 will be included in this section. In step 2400 (which may be optional), the UE receives input data provided by the host computer. Additionally or alternatively, in step 2402, the UE provides user data. In sub-step 2404 (which may be optional) of step 2400, the UE provides the user data by executing a client application. In sub-step 2406 (which may be optional) of step 2402, the UE executes a client application which provides the user data in reaction to the received input data provided by the host computer. In providing the user data, the executed client application may further consider user input received from the user. Regardless of the specific manner in which the user data was provided, the UE initiates, in sub-step 2408 (which may be optional), transmission of the user data to the host computer. In step 2410 of the method, the host computer receives the user data transmitted from the UE, in accordance with the teachings of the embodiments described throughout this disclosure.

FIG. 25 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 25 will be included in this section. In step 2500 (which may be optional), in accordance with the teachings of the embodiments described throughout this disclosure, the base station receives user data from the UE. In step 2502 (which may be optional), the base station initiates transmission of the received user data to the host computer. In step 2504 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Embodiments

Group A Embodiments

Embodiment 1: A method performed by a wireless device for reliable Channel State Information, CSI, feedback, the method comprising one or more of: receiving (600) a configuration for one or more of: i. Semi-Persistent CSI, SP-CSI, reporting on Physical Uplink Control Channel, PUCCH, comprising a first PUCCH resource activated with a first and a second spatial relation or uplink Transmission Configuration Indicator, TCI, states, a reporting periodicity, and/or slot offset; ii. SP-CSI reporting on Physical Uplink Shared Channel, PUSCH, comprising a reporting periodicity and slot offset; and iii. periodic CSI reporting on PUCCH comprising a second PUCCH resource activated with a third and a fourth spatial relations or uplink TCI states, and a reporting periodicity and slot offset; receiving (602) one or more of: i. an activation command activating the SP-CSI on PUCCH; ii. an activation Downlink Control Information, DCI, activating the SP-CSI on PUSCH, wherein the DCI comprising a first and a second SRS Resource Indicators, SRIs, and a PUSCH resource; transmitting (604) one or more of: i. a SP-CSI in the first PUCCH resource in a first transmission occasion according to the first spatial relation and in a second transmission occasion according to the second spatial relation activated for the first PUCCH resource; ii. a periodic CSI in the second PUCCH resource in a third transmission according to the third spatial relation and in a fourth transmission according to the fourth spatial relation configured for the second PUCCH resource; iii. a SP-CSI in the PUSCH resource in a fifth transmission occasion according to the first SRI and in a sixth transmission occasion according to the second SRI.

Embodiment 2: The method of any of the previous embodiments wherein the transmitting is to a wireless network node comprising multiple transmission and reception points, TRPs, each is associated with a spatial relation or a SRI.

Embodiment 3: The method of any of the previous embodiments wherein each transmission occasion is in either a slot or a mini-slot containing a number of OFDM symbols within a slot.

Embodiment 4: The method of any of the previous embodiments wherein the first and the second transmission occasions are in two adjacent slots or mini-slots in each reporting period for the SP-CSI on PUCCH.

Embodiment 5: The method of any of the previous embodiments wherein the third and the fourth transmission occasions are in two adjacent slots or mini-slots in each reporting period for the P-CSI on PUCCH.

Embodiment 6: The method of any of the previous embodiments wherein the fifth and the sixth transmission occasions are in two adjacent slots or mini-slots for the SP-CSI on PUSCH.

Embodiment 7: The method of any of the previous embodiments wherein the activation command can be one of: a MAC CE; and a DL DCI.

Embodiment 8: The method of any of the previous embodiments further comprising transmitting a first CSI in a first slot or mini-slot in a first reporting period according to the first spatial relation or SRI and a second CSI in a second slot or mini-slot in a second reporting period according to the second spatial relation or SRI.

Embodiment 9: The method of any of the previous embodiments wherein each of the first to the fourth spatial relations comprises a Reference Signal, RS, defining a transmission spatial filter and a set of power control parameters for the associated PUCCH.

Embodiment 10: The method of any of the previous embodiments wherein each of the first and the second SRIs indicates a SRS resource with a number of antenna ports over which the PUSCH is transmitted and a set of power control parameters for the PUSCH.

Embodiment 11: The method of any of the previous embodiments wherein configuring SP-CSI reporting on PUSCH further comprises configuring a first and a second open-loop power control parameters associated with the first and the second SRIs, respectively.

Embodiment 12: The method of any of the previous embodiments further comprising indicating a number of transmission occasions in the first or the second PUCCH resource, or in the activating DCI.

Embodiment 13: The method of any of the previous embodiments wherein, in case the number of transmission occasions is more than one, the spatial relations are applied to the transmission occasions in either a cyclic manner or a sequential manner in which a first spatial relation is applied to a first subset of transmission occasions and a second spatial relation is applied to the rest of the transmission occasions.

Embodiment 14: The method of any of the previous embodiments wherein For SP CSI on PUSCH, activating the SP CSI with a DCI containing two SRIs, each associated with one of two TRPs.

Embodiment 15: The method of any of the previous embodiments wherein, in each SP CSI reporting period, the wireless device sends a SP CSI in two slots or mini-slots in a same PUSCH resource, each towards one of the two TRPs.

Embodiment 16: The method of any of the previous embodiments wherein the number of repetitions is determined by the "K" value in the TDRA indicated in the activation DCI and the mapping between a CSI transmission to a TRP can be either in a cyclic manner or sequential manner.

Embodiment 17: The method of any of the previous embodiments wherein the number of repetitions is determined jointly by the "K" value in the TDRA and the number of SRIs indicated in the activation DCI and the CSI is repeated K times only if more than one SRI are indicated.

Embodiment 18: The method of any of the previous embodiments wherein when two SRIs are indicated in the activation DCI, the SP CSI is transmitted to different TRPs in different reporting periods in a cyclic manner.

Embodiment 19: The method of any of the previous embodiments wherein, for SP CSI or periodic CSI on PUCCH, a PUCCH resource is configured for each BWP with two spatial relations, each associated with one of two TRPs.

Embodiment 20: The method of any of the previous embodiments wherein, in each SP CSI or periodic CSI reporting period, the SP CSI or the periodic CSI is repeated in either two slots or two mini-slots of a same slot in the same PUCCH resource in a CSI reporting period.

Embodiment 21: The method of any of the previous embodiments wherein each repetition is towards one of the two TRPs.

Embodiment 22: The method of any of the previous embodiments wherein the number of repetitions is configured in the PUCCH resource for the SP CSI or periodic CSI.

Embodiment 23: The method of any of the previous embodiments wherein the mapping between a SP CSI or periodic CSI transmission and a TRP can be in either a cyclic manner between the two TRPs or sequential manner.

Embodiment 24: The method of any of the previous embodiments wherein different PUCCH resources may be configured for SP CSI or periodic CSI to different TRPs.

Embodiment 25: The method of any of the previous embodiments wherein the SP CSI on PUCCH is activated/deactivated by a DL DCI.

Embodiment 26: The method of any of the previous embodiments, further comprising: providing user data; and forwarding the user data to a host computer via the transmission to the base station.

Group B Embodiments

Embodiment 27: A method performed by a base station for reliable Channel State Information, CSI, feedback, the method comprising one or more of: transmitting (700), to a wireless device, a configuration for one or more of: i. Semi-Persistent CSI, SP-CSI, reporting on Physical Uplink Control Channel, PUCCH, comprising a first PUCCH resource activated with a first and a second spatial relation or uplink Transmission Configuration Indicator, TCI, states, a reporting periodicity, and/or slot offset; ii. SP-CSI reporting on Physical Uplink Shared Channel, PUSCH, comprising a reporting periodicity and slot offset; and iii. periodic CSI reporting on PUCCH comprising a second PUCCH resource activated with a third and a fourth spatial relations or uplink TCI states, and a reporting periodicity and slot offset; transmitting (702), to the wireless device, one or more of: i. an activation command activating the SP-CSI on PUCCH; ii. an activation Downlink Control Information, DCI, activating the SP-CSI on PUSCH, wherein the DCI comprising a first and a second SRS Resource Indicators, SRIs, and a PUSCH resource; receiving (704), from the wireless device, one or more of: i. a SP-CSI in the first PUCCH resource in a first transmission occasion according to the first spatial relation and in a second transmission occasion according to the second spatial relation activated for the first PUCCH resource; ii. a periodic CSI in the second PUCCH resource in a third transmission according to the third spatial relation and in a fourth transmission according to the fourth spatial relation configured for the second PUCCH resource; and iii. a SP-CSI in the PUSCH resource in a fifth transmission occasion according to the first SRI and in a sixth transmission occasion according to the second SRI.

Embodiment 28: The method of any of the previous embodiments wherein the base station is a wireless network node comprising multiple transmission and reception points, TRPs, each is associated with a spatial relation or a SRI.

Embodiment 29: The method of any of the previous embodiments wherein each transmission occasion is in either a slot or a mini-slot containing a number of OFDM symbols within a slot.

Embodiment 30: The method of any of the previous embodiments wherein the first and the second transmission occasions are in two adjacent slots or mini-slots in each reporting period for the SP-CSI on PUCCH.

Embodiment 31: The method of any of the previous embodiments wherein the third and the fourth transmission occasions are in two adjacent slots or mini-slots in each reporting period for the P-CSI on PUCCH.

Embodiment 32: The method of any of the previous embodiments wherein the fifth and the sixth transmission occasions are in two adjacent slots or mini-slots for the SP-CSI on PUSCH.

Embodiment 33: The method of any of the previous embodiments wherein the activation command can be one of: a MAC CE; and a DL DCI.

Embodiment 34: The method of any of the previous embodiments further comprising receiving a first CSI in a first slot or mini-slot in a first reporting period according to the first spatial relation or SRI and a second CSI in a second slot or mini-slot in a second reporting period according to the second spatial relation or SRI.

Embodiment 35: The method of any of the previous embodiments wherein each of the first to the fourth spatial relations comprises a Reference Signal, RS, defining a transmission spatial filter and a set of power control parameters for the associated PUCCH.

Embodiment 36: The method of any of the previous embodiments wherein each of the first and the second SRIs indicates a SRS resource with a number of antenna ports over which the PUSCH is transmitted and a set of power control parameters for the PUSCH.

Embodiment 37: The method of any of the previous embodiments wherein configuring SP-CSI reporting on PUSCH further comprises configuring a first and a second open-loop power control parameters associated with the first and the second SRIs, respectively.

Embodiment 38: The method of any of the previous embodiments further comprising indicating a number of transmission occasions in the first or the second PUCCH resource, or in the activating DCI.

Embodiment 39: The method of any of the previous embodiments wherein, in case the number of transmission occasions is more than one, the spatial relations are applied to the transmission occasions in either a cyclic manner or a sequential manner in which a first spatial relation is applied to a first subset of transmission occasions and a second spatial relation is applied to the rest of the transmission occasions.

Embodiment 40: The method of any of the previous embodiments wherein For SP CSI on PUSCH, activating the SP CSI with a DCI containing two SRIs, each associated with one of two TRPs.

Embodiment 41: The method of any of the previous embodiments wherein, in each SP CSI reporting period, the wireless device sends a SP CSI in two slots or mini-slots in a same PUSCH resource, each towards one of the two TRPs.

Embodiment 42: The method of any of the previous embodiments wherein the number of repetitions is determined by the "K" value in the TDRA indicated in the activation DCI and the mapping between a CSI transmission to a TRP can be either in a cyclic manner or sequential manner.

Embodiment 43: The method of any of the previous embodiments wherein the number of repetitions is determined jointly by the "K" value in the TDRA and the number of SRIs indicated in the activation DCI and the CSI is repeated K times only if more than one SRI are indicated.

Embodiment 44: The method of any of the previous embodiments wherein when two SRIs are indicated in the activation DCI, the SP CSI is transmitted to different TRPs in different reporting periods in a cyclic manner.

Embodiment 45: The method of any of the previous embodiments wherein, for SP CSI or periodic CSI on PUCCH, a PUCCH resource is configured for each BWP with two spatial relations, each associated with one of two TRPs.

Embodiment 46: The method of any of the previous embodiments wherein, in each SP CSI or periodic CSI reporting period, the SP CSI or the periodic CSI is repeated in either two slots or two mini-slots of a same slot in the same PUCCH resource in a CSI reporting period.

Embodiment 47: The method of any of the previous embodiments wherein each repetition is towards one of the two TRPs.

Embodiment 48: The method of any of the previous embodiments wherein the number of repetitions is configured in the PUCCH resource for the SP CSI or periodic CSI.

Embodiment 49: The method of any of the previous embodiments wherein the mapping between a SP CSI or periodic CSI transmission and a TRP can be in either a cyclic manner between the two TRPs or sequential manner.

Embodiment 50: The method of any of the previous embodiments wherein different PUCCH resources may be configured for SP CSI or periodic CSI to different TRPs.

Embodiment 51: The method of any of the previous embodiments wherein the SP CSI on PUCCH is activated/deactivated by a DL DCI.

Embodiment 52: The method of any of the previous embodiments, further comprising: obtaining user data; and forwarding the user data to a host computer or a wireless device.

Group C Embodiments

Embodiment 53: A wireless device for reliable Channel State Information, CSI, feedback, the wireless device comprising: processing circuitry configured to perform any of the steps of any of the Group A embodiments; and power supply circuitry configured to supply power to the wireless device.

Embodiment 54: A base station for reliable Channel State Information, CSI, feedback, the base station comprising: processing circuitry configured to perform any of the steps of any of the Group B embodiments; and power supply circuitry configured to supply power to the base station.

Embodiment 55: A User Equipment, UE, for reliable Channel State Information, CSI, feedback, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 56: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 57: The communication system of the previous embodiment further including the base station.

Embodiment 58: The communication system of the previous 2 embodiments, further including the UE, wherein the UE is configured to communicate with the base station.

Embodiment 59: The communication system of the previous 3 embodiments, wherein: the processing circuitry of the host computer is configured to execute a host application, thereby providing the user data; and the UE comprises processing circuitry configured to execute a client application associated with the host application.

Embodiment 60: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 61: The method of the previous embodiment, further comprising, at the base station, transmitting the user data.

Embodiment 62: The method of the previous 2 embodiments, wherein the user data is provided at the host computer by executing a host application, the method further comprising, at the UE, executing a client application associated with the host application.

Embodiment 63: A User Equipment, UE, configured to communicate with a base station, the UE comprising a radio interface and processing circuitry configured to perform the method of the previous 3 embodiments.

Embodiment 64: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 65: The communication system of the previous embodiment, wherein the cellular network further includes a base station configured to communicate with the UE.

Embodiment 66: The communication system of the previous 2 embodiments, wherein: the processing circuitry of the host computer is configured to execute a host application, thereby providing the user data; and the UE's processing circuitry is configured to execute a client application associated with the host application.

Embodiment 67: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 68: The method of the previous embodiment, further comprising at the UE, receiving the user data from the base station.

Embodiment 69: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 70: The communication system of the previous embodiment, further including the UE.

Embodiment 71: The communication system of the previous 2 embodiments, further including the base station, wherein the base station comprises a radio interface configured to communicate with the UE and a communication interface configured to forward to the host computer the user data carried by a transmission from the UE to the base station.

Embodiment 72: The communication system of the previous 3 embodiments, wherein: the processing circuitry of the host computer is configured to execute a host application; and the UE's processing circuitry is configured to execute a client application associated with the host application, thereby providing the user data.

Embodiment 73: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 74: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 75: The method of the previous embodiment, further comprising, at the UE, providing the user data to the base station.

Embodiment 76: The method of the previous 2 embodiments, further comprising: at the UE, executing a client application, thereby providing the user data to be transmitted; and at the host computer, executing a host application associated with the client application.

Embodiment 77: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 78: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 79: The communication system of the previous embodiment further including the base station.

Embodiment 80: The communication system of the previous 2 embodiments, further including the UE, wherein the UE is configured to communicate with the base station.

Embodiment 81: The communication system of the previous 3 embodiments, wherein: the processing circuitry of the host computer is configured to execute a host application; and the UE is configured to execute a client application associated with the host application, thereby providing the user data to be received by the host computer.

Embodiment 82: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 83: The method of the previous embodiment, further comprising at the base station, receiving the user data from the UE.

Embodiment 84: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
ACK Acknowledgement
AF Application Function
AMF Access and Mobility Function
AN Access Network
AP Access Point
ASIC Application Specific Integrated Circuit
AUSF Authentication Server Function
BLER Block Error Rate
BWP Bandwidth Part
CE Control Element
CG Configuration Grant
CP-OFDM Cyclic Prefix Orthogonal Frequency Division Multiplexing
CPU Central Processing Unit
CQI Channel Quality Indicator
CRC Cyclic Redundancy Check
CSI Channel State Information
CSI-RS Channel State Information Reference Signal
DCI Downlink Control Information
DFT Discrete Fourier Transform
DL Downlink
DMRS Demodulation Reference Signal
DN Data Network
DSP Digital Signal Processor
eNB Enhanced or Evolved Node B
FPGA Field Programmable Gate Array
FR Frequency Range
gNB New Radio Base Station
gNB-CU New Radio Base Station Central Unit
gNB-DU New Radio Base Station Distributed Unit
HARQ Hybrid Automatic Repeat Request
HSS Home Subscriber Server
IoT Internet of Things
IP Internet Protocol
LTE Long Term Evolution
MAC Medium Access Control
MCS Modulation and Coding Scheme
MIMO Multiple Input Multiple Output
MME Mobility Management Entity
MTC Machine Type Communication
NEF Network Exposure Function
NF Network Function
NR New Radio
NRF Network Function Repository Function
NSSF Network Slice Selection Function
NZP Non-Zero Power
OFDM Orthogonal Frequency Division Multiplexing
OTT Over-the-Top
PC Personal Computer

34

PCF Policy Control Function
P-GW Packet Data Network Gateway
PMI Precoder Matrix Indicator
PUCCH Physical Uplink Control Channel
PUSCH Physical Uplink Shared Channel
RAM Random Access Memory
RAN Radio Access Network
RB Resource Block
RE Resource Element
RI Rank Indicator
RNTI Radio Network Temporary Identifier
ROM Read Only Memory
RRC Radio Resource Control
RRH Remote Radio Head
RS Reference Signal
RTT Round Trip Time
SCEF Service Capability Exposure Function
SINR Signal to Interference Plus Noise Ratio
SMF Session Management Function
SP Semi-Persistent
SP-CSI Semi-Persistent Channel State Information
SR Scheduling Request
SRI SRS Resource Indicator
SRS Sounding Reference Signal
SSB Synchronization Signal Block
TB Transport Block
TCI Transmission Configuration Indicator
TDD Time Division Duplexing
TDRA Time-Domain Resource Allocation
TRP Transmission and Reception Point
UCI UL Control Information
UDM Unified Data Management
UE User Equipment
UL Uplink
UPF User Plane Function Those skilled in the art will recognize improvements and modifications to the embodiments of the present disclosure. All such improvements and modifications are considered within the scope of the concepts disclosed herein.

What is claimed is:

1. A method performed by a wireless device for reliable Channel State Information, CSI, feedback, the method comprising:

receiving a configuration for Semi-Persistent CSI, SP-CSI, reporting on a Physical Uplink Shared Channel, PUSCH, comprising a reporting periodicity and a list of slot offsets, and a first and a second Sounding Reference Signal, SRS, Resource sets;

receiving an activation Downlink Control Information, DCI, activating the SP-CSI on the PUSCH, wherein the DCI comprising a first and a second SRS Resource Indicators, SRIs, indicating a first and a second SRS resources in the first and the second SRS resource sets, respectively, a slot offset from the list of slot offsets, and a PUSCH resource allocation including a number of transmission occasions configured or indicated in the Time Domain Resource Allocation, TDRA, field of the activation DCI;

determining the number of transmission occasions in which SP-CSI is to be transmitted according to the number of SRS resource sets from which SRIs are indicated in the DCI, regardless of the number of transmission occasions configured or indicated in the TDRA field of the activation DCI; and transmitting an SP-CSI report in the PUSCH resource in a first transmission occasion according to the first (or the second) SRI and in a second transmission occasion according to the second (or the first) SRI in each reporting period specified by the reporting periodicity and the slot offset.

2. The method of claim 1, wherein the transmitting is to a wireless network node comprising multiple transmission and reception points, TRPs; each is associated with a spatial relation or an SRS resource set.

3. The method of claim 1, wherein each transmission occasion is in either a slot or a mini-slot containing a number of consecutive Orthogonal Frequency Division Multiplexing, OFDM, symbols within a slot.

4. The method of claim 1, wherein the first and the second transmission occasions are in two consecutive slots or mini-slots for the SP-CSI on the PUSCH, wherein the slot or mini-slot starting early in time among the two adjacent slots or mini-slots is determined by the reporting periodicity and the slot offset.

5. The method of claim 1, further comprising transmitting the SP-CSI report in a first slot or mini-slot according to the first SRI and in a second slot or mini-slot according to the second SRI in the same reporting period.

6. The method of claim 1, wherein the first and the second SRIs indicate respectively a first and a second SRS resources and a first and a second sets of power control parameters associated to the first and the second transmission occasions, respectively, for the PUSCH.

7. The method of claim 1, wherein the configuration of the SP-CSI reporting on PUSCH further comprises a first and a second sets of power control parameters associated to, respectively, the first and the second transmission occasions of the PUSCH carrying the SP-CSI report.

8. The method of claim 4, wherein the wireless device sends the SP CSI in the two consecutive slots or mini-slots in a same PUSCH resource.

9. The method of claim 1, wherein when the two SRIs are indicated in the activation DCI, the SP CSIs transmitted in different reporting periods are associated with the two SRIs in a cyclic manner.

10. The method of claim 1, wherein the activating DCI for the SP-CSI on PUSCH is one of DCI format 0_1 and DCI format 0_2.

11. The method of claim 1, wherein:

receiving the configuration comprises: receiving the configuration for the SP-CSI reporting on the PUSCH comprising a reporting periodicity and one or more slot offsets;

receiving one or more activations comprises: receiving the activation DCI activating the SP-CSI on the PUSCH, where the DCI comprises the first and the second SRIs and the PUSCH resource; and transmitting the SP-CSI comprises: transmitting the SP-CSI in the PUSCH resource in the first transmission occasion according to the first SRI and in the second transmission occasion according to the second SRI.

12. A method performed by a base station for reliable Channel State Information, CSI, feedback, the method comprising:

transmitting, to a wireless device, a configuration for Semi-Persistent CSI, SP-CSI, reporting on a Physical Uplink Shared Channel, PUSCH, comprising a reporting periodicity and a list of slot offsets, and a first and a second Sounding Reference Signal, SRS, Resource sets;

transmitting, to the wireless device, an activation Downlink Control Information, DCI, activating the SP-CSI on the PUSCH, wherein the DCI comprising a first and a second SRS Resource Indicators, SRIs, indicating a first and a second SRS resource in the first and the second SRS resource sets, respectively, a slot offset from the list of slot offsets, and a PUSCH resource allocation including a number of transmission occasions configured or indicated in the Time Domain Resource Allocation, TDRA, field of the activation DCI; and receiving, from the wireless device, an SP-CSI report in the PUSCH resource in a first transmission occasion according to the first (or the second) SRI and in a second transmission occasion according to the second (or the first) SRI in each reporting period specified by the reporting periodicity and the slot offset.

13. The method of claim 12, wherein the base station is a wireless network node comprising multiple transmission and reception points, TRP; each is associated with a spatial relation or an SRS resource set.

14. The method of claim 12, wherein each transmission occasion is in either a slot or a mini-slot containing a number of consecutive Orthogonal Frequency Division Multiplexing, OFDM, symbols within a slot.

15. The method of claim 12, wherein the first and the second transmission occasions are in two consecutive slots or mini-slots for the SP-CSI on the PUSCH, wherein the slot or mini-slot starting early in time among the two adjacent slots or mini-slots is determined by the reporting periodicity and the slot offset.

16. The method of claim 12, further comprising receiving the SP-CSI report in a first slot or mini-slot according to the first SRI and in a second slot or mini-slot according to the second SRI in the same reporting period.

17. The method of claim 12, wherein the first and the second SRIs indicate respectively a first and a second SRS resources and a first and a second sets of power control parameters associated to the first and the second transmission occasions, respectively, for the PUSCH.

18. The method of claim 12, wherein the configuration of the SP-CSI reporting on PUSCH further comprises a first and a second sets of power control parameters associated to, respectively, the fifth and the sixth transmission occasions of the PUSCH carrying the SP-CSI report.

19. The method of claim 14, wherein the wireless device sends the SP CSI in the two consecutive slots or mini-slots in a same PUSCH resource.

20. The method of claim 12, wherein when the two SRIs are indicated in the activation DCI, the SP CSIs transmitted in different reporting periods are associated with the two SRIs in a cyclic manner.

21. The method of claim 12, wherein the activating DCI for the SP-CSI on PUSCH is one of DCI format 0_1 and DCI format 0_2.

22. A wireless device comprising:

one or more transmitters;

one or more receivers; and processing circuitry associated with the one or more transmitters and the one or more receivers, the processing circuitry configured to cause the wireless device to:

receive a configuration for: Semi-Persistent Channel State Information, SP-CSI, reporting on a Physical Uplink Shared Channel, PUSCH, comprising a second reporting periodicity and a list of slot offsets, and a first and a second Sounding Reference Signal, SRS, Resource sets;

receive an activation Downlink Control Information, DCI, activating the SP-CSI on the PUSCH, wherein the DCI comprising a first and a second SRS Resource Indicators, SRIs, indicating a first and a second SRS resource in the first and the second SRS resource sets, respectively, a slot offset from the list of slot offsets, and a PUSCH resource allocation including a number of transmission occasions configured or indicated in the Time Domain Resource Allocation, TDRA, field of the activation DCI;

determine the number of transmission occasions in which SP-CSI is to be transmitted according to the number of SRS resource sets from which SRIs are indicated in the DCI, regardless of the number of transmission occasions configured or indicated in the TDRA field of the activation DCI; and transmit an SP-CSI report in the PUSCH resource in a first transmission occasion according to the first (or the second) SRI and in a second transmission occasion according to the second (or the first) SRI in each reporting period specified by the reporting periodicity and the slot offset.

23. A radio access node comprising:

one or more transmitters;

one or more receivers; and processing circuitry associated with the one or more transmitters and the one or more receivers, the processing circuitry configured to cause the radio access node to:

transmit Semi-Persistent Channel State Information, SP-CSI, reporting on a Physical Uplink Shared Channel, PUSCH, comprising a second reporting periodicity and a list of slot offsets, and a first and a second Sounding Reference Signal, SRS, Resource sets;

transmit an activation Downlink Control Information, DCI, activating the SP-CSI on the PUSCH, wherein the DCI comprising a first and a second SRS Resource Indicators, SRIs, indicating a first and a second SRS resource in the first and the second SRS resource sets, respectively, a slot offset from the list of slot offsets, and a PUSCH resource allocation including a number of transmission occasions configured or indicated in the Time Domain Resource Allocation, TDRA, field of the activation DCI; and receive an SP-CSI report in the PUSCH resource in a first transmission occasion according to the first (or the second) SRI and in a second transmission occasion according to the second (or the first) SRI in each reporting period specified by the reporting periodicity and the slot offset.

\* \* \* \* \*